United States Patent
Kato et al.

(10) Patent No.: US 11,801,118 B2
(45) Date of Patent: Oct. 31, 2023

(54) DENTAL TREATMENT APPARATUS AND METHOD OF DRIVING THE SAME

(71) Applicant: J. MORITA MFG. CORP., Kyoto (JP)

(72) Inventors: Kyohei Kato, Kyoto (JP); Naoki Katsuda, Kyoto (JP); Kazunari Matoba, Kyoto (JP)

(73) Assignee: J. MORITA MFG. CORP., Kyoto (JP)

( * ) Notice: Subject to any disclaimer, the term of this patent is extended or adjusted under 35 U.S.C. 154(b) by 689 days.

(21) Appl. No.: 16/604,342

(22) PCT Filed: Aug. 9, 2018

(86) PCT No.: PCT/JP2018/029893
§ 371 (c)(1),
(2) Date: Oct. 10, 2019

(87) PCT Pub. No.: WO2019/044446
PCT Pub. Date: Mar. 7, 2019

(65) Prior Publication Data
US 2020/0155273 A1    May 21, 2020

(30) Foreign Application Priority Data
Aug. 28, 2017 (JP) ................... 2017-163405

(51) Int. Cl.
*A61C 5/42* (2017.01)
*A61C 1/00* (2006.01)
*A61C 1/06* (2006.01)

(52) U.S. Cl.
CPC ............ *A61C 5/42* (2017.02); *A61C 1/003* (2013.01); *A61C 1/0023* (2013.01); *A61C 1/06* (2013.01)

(58) Field of Classification Search
CPC ......... A61C 5/42; A61C 1/0023; A61C 1/003; A61C 1/06; A61C 1/0015; A61C 5/44;
(Continued)

(56) References Cited

U.S. PATENT DOCUMENTS 5,980,248 A * 11/1999 Kusakabe ............... H02P 7/288
433/131
6,293,795 B1   9/2001 Johnson
(Continued)

FOREIGN PATENT DOCUMENTS

| CN | 101658443 A | 3/2010 |
| CN | 102427774 A | 4/2012 |
(Continued)

OTHER PUBLICATIONS

Office Action issued in Chinese Application No. 201880048031.0; dated Feb. 3, 2021 (17 pages).
(Continued)

*Primary Examiner* — Jacqueline T Johanas
*Assistant Examiner* — Shannel Nicole Belk
(74) *Attorney, Agent, or Firm* — Osha Bergman Watanabe & Burton LLP

(57) ABSTRACT

A dental treatment apparatus includes a handpiece holding a cutting tool in its head, a drive portion driving the cutting tool held by the head, and a control portion controlling the drive portion in accordance with a drive sequence. The drive sequence includes at least one forward rotation drive for rotating the cutting tool in a cutting direction to cut a treatment portion and at least one reverse rotation drive for rotating the cutting tool in a non-cutting direction. Under the control of the drive portion in accordance with the drive sequence, a cumulative amount of rotation which is an accumulation of an amount of rotation in forward rotation drive and an amount of rotation in reverse rotation drive does not exceed a set value at any time point.

15 Claims, 15 Drawing Sheets

(58) Field of Classification Search
CPC ..... A61C 19/041; A61C 1/0007; A61C 1/186;
A61C 3/02; A61C 5/48; A61C 5/40
See application file for complete search history.

(56) References Cited

U.S. PATENT DOCUMENTS

| | | | |
|---|---|---|---|
| 7,839,107 B2 | 11/2010 | Sauter et al. | |
| 2008/0102419 A1 | 5/2008 | Sauter et al. | |
| 2011/0039229 A1* | 2/2011 | Senia | A61C 5/44 433/131 |
| 2012/0225406 A1* | 9/2012 | Yared | A61C 1/186 433/102 |
| 2013/0099710 A1 | 4/2013 | Okamoto | |
| 2013/0108978 A1* | 5/2013 | Yamashita | A61C 1/0015 433/27 |
| 2013/0224677 A1* | 8/2013 | Yamashita | A61C 1/003 433/27 |
| 2013/0224678 A1* | 8/2013 | Yamashita | A61C 19/041 433/131 |
| 2014/0134565 A1 | 5/2014 | Kunisada | |
| 2015/0086937 A1* | 3/2015 | Katsuda | A61C 1/186 433/224 |
| 2015/0086941 A1 | 3/2015 | Katsuda et al. | |
| 2015/0216623 A1 | 8/2015 | Yared | |
| 2016/0067011 A1 | 3/2016 | Rothenwaender et al. | |
| 2017/0070169 A1 | 3/2017 | Altendorf et al. | |
| 2017/0265961 A1* | 9/2017 | Kato | A61C 5/44 |

FOREIGN PATENT DOCUMENTS

| | | | |
|---|---|---|---|
| CN | 102836011 A | 12/2012 | |
| CN | 103379875 A | 10/2013 | |
| CN | 105981290 A | 9/2016 | |
| JP | 3264607 B2 | 3/2002 | |
| JP | 2003-504113 A | 2/2003 | |
| JP | 2015-058274 A | 3/2015 | |
| JP | 2016-198191 A | 12/2016 | |
| JP | 2016198191 A * | 12/2016 | |
| KR | 20160000320 A | 1/2016 | |
| WO | WO-2014036634 A1 * | 3/2014 | ........... A61C 1/0007 |
| WO | 2014/187841 A2 | 11/2014 | |
| WO | 2014/187841 A3 | 1/2015 | |

OTHER PUBLICATIONS

Notification of Patent Grant issued in Chinese Application No. 201880048031.0; dated Aug. 25, 2021 (5 pages).
Notification of Patent Grant issued in Korean Application No. 10-2019-7032493; dated Sep. 17, 2021 (4 pages).
International Search Report issued in PCT/JP2018/029893 dated Oct. 23, 2018 (1 page).
Written Opinion of the International Searching Authority issued in PCT/JP2018/029893 dated Oct. 23, 2018 (4 pages).

* cited by examiner

FIG.4

MAGNITUDE OF FRACTURE ANGLE (DEGREE)

|   | #15   | #20 | #25   | #30   | #35   | #40 |
|---|-------|-----|-------|-------|-------|-----|
| A | 750   | 660 | 630   | 510   | 480   | 520 |
| B | 640   | 470 | 810   | 560   | 640   | 490 |
| C | 1,210 | 930 | 770   | 780   | 940   | 680 |
| D | 1,110 | 940 | 850   | 770   | 960   | 850 |
| E | 840   | 510 | 380   | 1,000 | 940   | 830 |
| F | 1,000 |     | 1,030 |       | 1,030 |     |

FIG.12
[SET1]
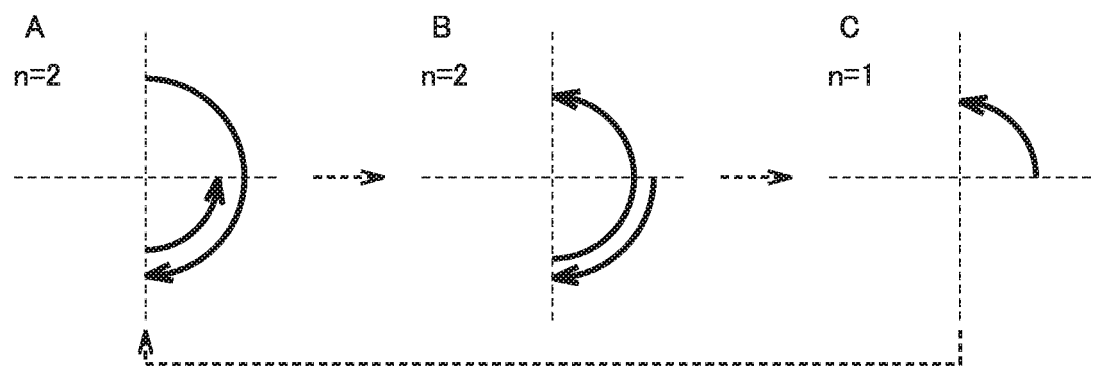
[SET2]
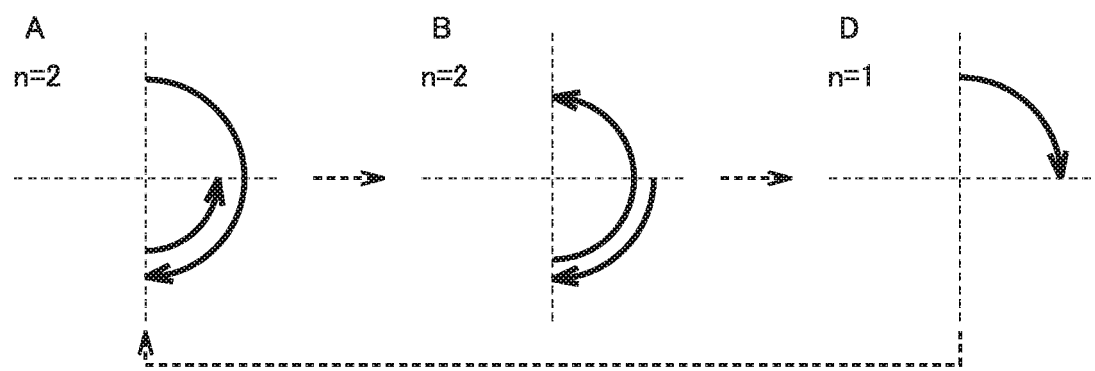

DENTAL TREATMENT APPARATUS AND METHOD OF DRIVING THE SAME

TECHNICAL FIELD

The present invention relates to a dental treatment apparatus including a handpiece and particularly to a dental treatment apparatus cutting an inner wall of a root canal of a tooth and enlarging the root canal and a method of driving the same.

BACKGROUND ART

In dental treatment, treatment for cutting and enlarging a root canal of a tooth may be performed. In the treatment, a dental treatment apparatus in which a cutting tool called a file or a reamer is attached to a head of a handpiece is used and a root canal of a tooth is cut and enlarged by driving the cutting tool. Various types of control are available as control for the dental treatment apparatus to drive the cutting tool to cut and enlarge a root canal of a tooth. For example, PTLs 1 and 2 disclose control of drive of a cutting tool.

In a dental treatment apparatus disclosed in PTL 1, rotation of a cutting tool is controlled to forward rotation (right and clockwise rotation) or reverse rotation (left and counterclockwise rotation) by driving a motor to rotate forward or backward in accordance with a state of a rotation direction switch. The dental treatment apparatus disclosed in PTL 1 includes a load torque detection resistor detecting a load applied to the cutting tool. When the detected load reaches a reference set in advance, the motor is switched from forward rotation to reverse rotation and rotation of the cutting tool is controlled from forward rotation to reverse rotation.

In a dental treatment apparatus disclosed in PTL 2, such control is carried out that a tooth is cut by rotating a cutting tool clockwise by a first angle of rotation and in succession the cutting tool is rotated counterclockwise by a second angle of rotation so as not to positively cut a tooth. In the dental treatment apparatus disclosed in PTL 2, such control is carried out that the first angle of rotation is greater than the second angle of rotation so as to eject a substance from a surface of a root canal as the cutting tool travels through the root canal.

CITATION LIST

Patent Literature

PTL 1: Japanese Patent No. 3264607
PTL 2: Japanese National Patent Publication No. 2003-504113

SUMMARY OF INVENTION

Technical Problem

A root canal of a tooth is different in shape or condition from person to person, and in particular different in degree of curve or condition of calcification and clogging from person to person. Therefore, even though a cutting tool is driven under the control disclosed in PTLs 1 and 2, the cutting tool may be fractured by a load applied to the cutting tool. In particular, when a cutting tool small in diameter is driven by a motor to cut and enlarge a root canal, the cutting tool tends to be fractured.

The present invention was made to solve the problems above, and an object of the present invention is to provide a dental treatment apparatus driving a cutting tool attached to its head, the dental treatment apparatus controlling drive allowing prevention of fracture of a cutting tool, and a method of driving the same.

Solution to Problem

A dental treatment apparatus according to the present invention includes a handpiece holding a cutting tool in its head, a drive portion driving the cutting tool held by the head, and a control portion controlling the drive portion in accordance with a drive sequence. The drive sequence includes at least one forward rotation drive for rotating the cutting tool in a cutting direction to cut a treatment portion and at least one reverse rotation drive for rotating the cutting tool in a non-cutting direction. Under the control of the drive portion in accordance with the drive sequence, a cumulative amount of rotation which is an accumulation of an amount of rotation in the forward rotation drive and an amount of rotation in the reverse rotation drive does not exceed a set value at any time point.

Another dental treatment apparatus according to the present invention includes a handpiece holding a cutting tool in its head, a drive portion driving the cutting tool held by the head, and a control portion controlling the drive portion in accordance with a drive sequence. The drive sequence repeats forward rotation drive for rotating the cutting tool in a cutting direction to cut a treatment portion and reverse rotation drive for rotating the cutting tool in a non-cutting direction such that a cumulative amount of rotation from a position of start of drive of the cutting tool is smaller than a value set based on a predetermined break angle at any time point.

A method of driving a dental treatment apparatus according to the present invention is a method of driving a dental treatment apparatus, the dental treatment apparatus including a drive portion driving a cutting tool held by a head of a handpiece. A control portion controls the drive portion in accordance with a drive sequence. The drive sequence includes at least one forward rotation drive for rotating the cutting tool in a cutting direction to cut a treatment portion and at least one reverse rotation drive for rotating the cutting tool in a non-cutting direction. Under the control of the drive portion in accordance with the drive sequence, a cumulative amount of rotation which is an accumulation of an amount of rotation in the forward rotation drive and an amount of rotation in the reverse rotation drive does not exceed a set value at any time point.

Advantageous Effects of Invention

The dental treatment apparatus according to the present invention can achieve prevention of fracture of a cutting tool, because when the drive portion is controlled in accordance with a drive sequence, a cumulative amount of rotation which is an accumulation of an amount of rotation in forward rotation drive and an amount of rotation in reverse rotation drive does not exceed a set value at any time point.

BRIEF DESCRIPTION OF DRAWINGS

FIG. 4 is a diagram for illustrating relation of a manufacturer and a diameter with a fracture angle of a cutting tool.

FIG. 12 is a diagram for illustrating a third modification of the drive sequence to be used for the root canal treatment instrument according to the present first embodiment.

DESCRIPTION OF EMBODIMENTS (Summary)

Figure 1:
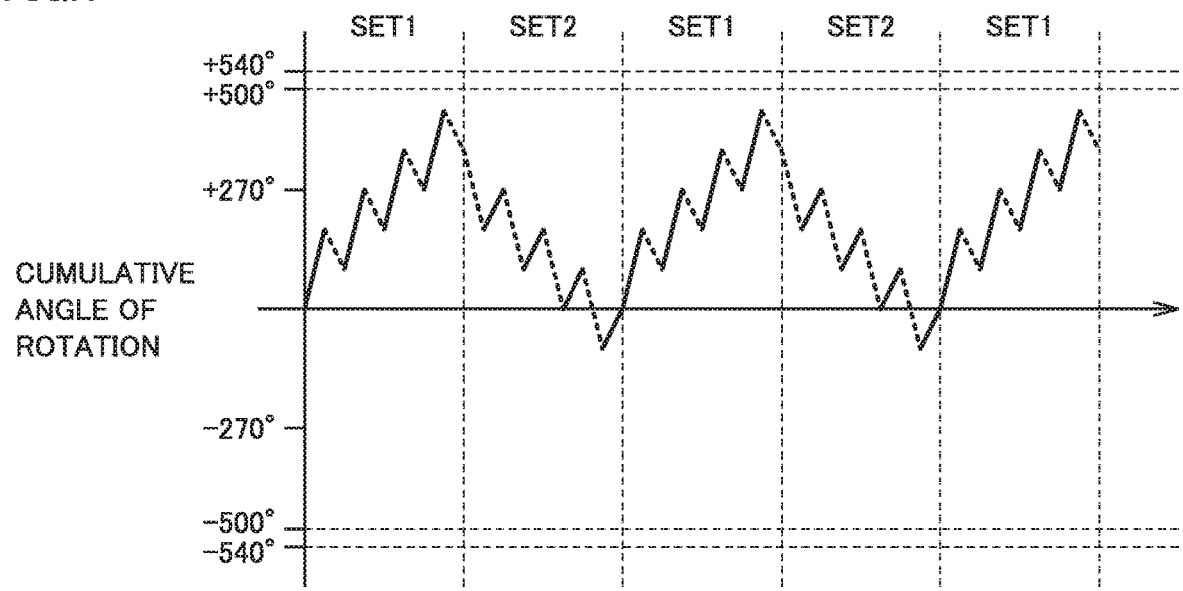
FIG. 1 is a diagram for illustrating change in cumulative angle of rotation when a root canal treatment instrument according to the present first embodiment is driven under a drive sequence.

Treatment for cutting and enlarging a root canal of a tooth is very difficult because a degree of curve of a root canal or a condition of calcification and clogging of the root canal is different from person to person. In cutting and enlarging a root canal with the use of a root canal treatment instrument representing a dental treatment apparatus, possible mechanisms of fracture of a cutting tool mainly include fracture due to cycle fatigue, fracture due to torsional fatigue, and fracture due to combination of such fatigue. In particular, fracture due to torsional fatigue (which is also simply referred to below as torsional fracture) is a fracture phenomenon of a cutting tool caused by being twisted as a result of bite of a cutting edge of the cutting tool into a wall of a root canal and forced rotation of the cutting tool with the cutting tool being restrained in the portion of bite.

An angle at which a cutting tool is twisted and fractured from this state of restraint (which is also simply referred to as a fracture angle below) is different depending on a material or a shape of the cutting tool. So long as the same cutting tool is driven within a range of angles smaller than the fracture angle, torsional fracture is less likely to occur. In addition, so long as a cutting tool is driven within a range of angles smaller than the smallest fracture angle of cutting tools to be used in a root canal treatment instrument, torsional fracture is less likely to occur. In the present invention, fracture of a cutting tool due to torsional fracture is prevented by controlling an angle of rotation (an amount of rotation) at which the cutting tool is driven in a root canal treatment instrument so as not to exceed a set value based on a fracture angle. Specifically, the set value is set based on a fracture angle in accordance with a type of a cutting tool to be used for a root canal treatment instrument or a smallest fracture angle of cutting tools to be used in a root canal treatment instrument. For example, when a fracture angle of a certain cutting tool is set to 510 degrees, 500 degrees is set as the set value in consideration of a margin. Therefore, when a root canal treatment instrument according to the present invention is driven in accordance with a drive sequence, drive is controlled such that a cumulative angle of rotation which is an accumulation of an angle of rotation in forward rotation drive and an angle of rotation in reverse rotation drive does not exceed 500 degrees as the set value at any point. The cumulative angle of rotation is expressed as a value of the sum of an angle of rotation in forward rotation drive expressed as a positive value and an angle of rotation in reverse rotation drive expressed as a negative value.

A drive sequence represents one unit of drive including at least one drive pattern. The drive pattern refers to a unit of control of drive which includes at least one of forward rotation drive for rotating a cutting tool in a cutting direction to cut a treatment portion (for example, a wall of a root canal) (which is also referred to below as a forward direction) and reverse rotation drive for rotating the cutting tool in a non-cutting direction (which is also referred to below as a reverse direction). For example, a drive sequence shown in FIG. 10 which will be described later consists of a drive pattern (SET1) in which drive for rotating the cutting tool by 180 degrees in the forward direction and 90 degrees in the reverse direction is repeated six times and a drive pattern (SET2) in which drive for rotating the cutting tool by 60 degrees in the forward direction and 240 degrees in the reverse direction is repeated three times. In the drive sequence shown in FIG. 10, repetition six times of the drive pattern with drive for rotating the cutting tool by 180 degrees in the forward direction and 90 degrees in the reverse direction being defined as the drive pattern may be considered as SET1. The drive pattern also includes drive for rotating the cutting tool only in the forward direction and drive for rotating the cutting tool only in the reverse direction.

(First Embodiment)

Figure 2:
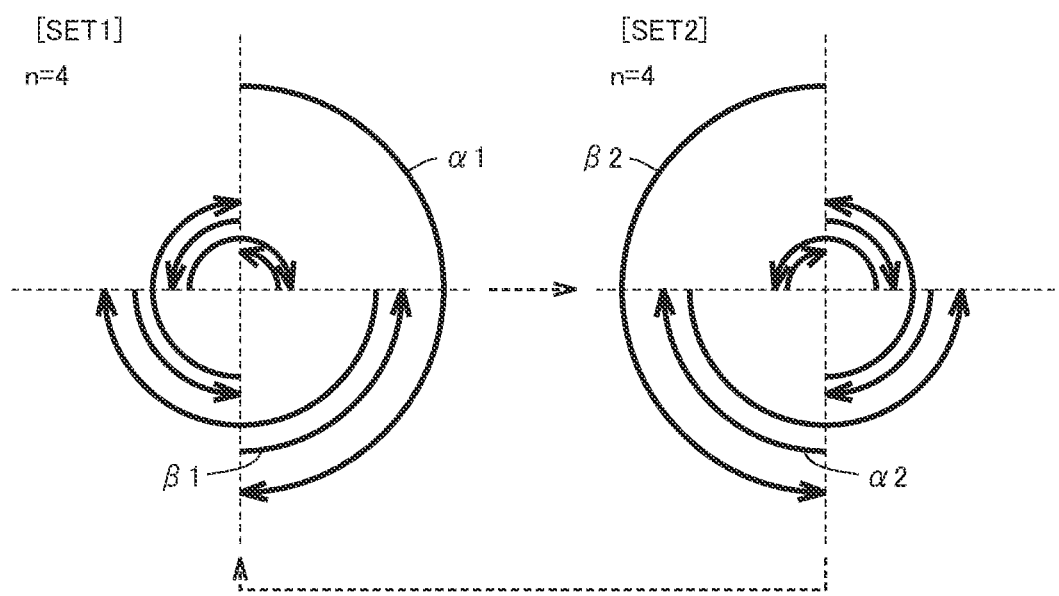
FIG. 2 is a diagram for illustrating one example of a drive sequence used in the root canal treatment instrument according to the present first embodiment.

In a root canal treatment instrument according to the present first embodiment, one drive sequence is set in advance by combining different drive patterns, and a cutting tool is driven based on the drive sequence. In the drive sequence, drive is controlled such that a cumulative angle of rotation does not exceed a set value at any time point. FIG. 1 is a diagram for illustrating change in cumulative angle of rotation when the root canal treatment instrument according to the present first embodiment is driven under a drive sequence. The abscissa shown in FIG. 1 represents time and the ordinate represents a cumulative angle of rotation. FIG. 2 is a diagram for illustrating one example of a drive sequence used in the root canal treatment instrument according to the present first embodiment. A solid arrow shown in FIG. 2 indicates a direction of rotation of the cutting tool and a dashed arrow indicates repetition of drive patterns.

The drive sequence shown in FIG. 2 consists of drive patterns of SET1 and SET2. After SET1 is performed, SET2 is performed. Furthermore, after SET2 is performed, the pattern returns to SET1, and thereafter SET1 and SET2 are alternately repeatedly performed. The drive pattern under SET1 consists of repetition four times of drive (n=4) in which the cutting tool is rotated by $\alpha1=180$ degrees in the forward direction (clockwise in the figure) and by $\beta1=90$ degrees in the reverse direction (counterclockwise in the figure). Namely, in the drive pattern under SET1, a cutting tool 5 is rotated by 720 degrees in total in the forward direction and by 360 degrees in total in the reverse direction, and hence cutting tool 5 consequently makes one rotation in the forward direction. The drive pattern under SET2 consists of repetition four times of drive (n=4) in which the cutting tool is rotated by $\beta2=90$ degrees in the forward direction and by $\alpha2=180$ degrees in the reverse direction. Namely, in the drive pattern under SET2, cutting tool 5 is rotated by 360 degrees in total in the forward direction and by 720 degrees in total in the reverse direction, and hence cutting tool 5 consequently makes one rotation in the reverse direction.

The drive pattern under SET2 is drive in which the cutting tool is rotated by 90 degrees in the forward direction and is rotated by 180 degrees in the reverse direction, and it is drive for cutting and enlargement aiming at cutting and enlargement in particular of a greatly curved root canal such that a portion on an inner side and a portion on an outer side of the curved root canal are equal to each other in degree of cutting. The drive pattern under SET2 is drive called a balanced force technique for the cutting tool to perform cutting and enlargement in conformity with a shape of the root canal.

As shown in FIG. 1, in the drive pattern under SET1, a cumulative angle of rotation increases up to 450 degrees at the maximum (a time point when fourth drive in the forward direction is performed), however, it does not exceed 500 degrees as the set value. By thereafter driving the cutting tool in the drive pattern under SET2, the cumulative angle of rotation decreases to 0 (zero) degree. Thereafter, even though the root canal treatment instrument is successively driven in accordance with a drive sequence of repeated drive in the drive pattern under SET1 and the drive pattern under SET2, the cumulative angle of rotation does not exceed the set value at any time point.

Figure 3:
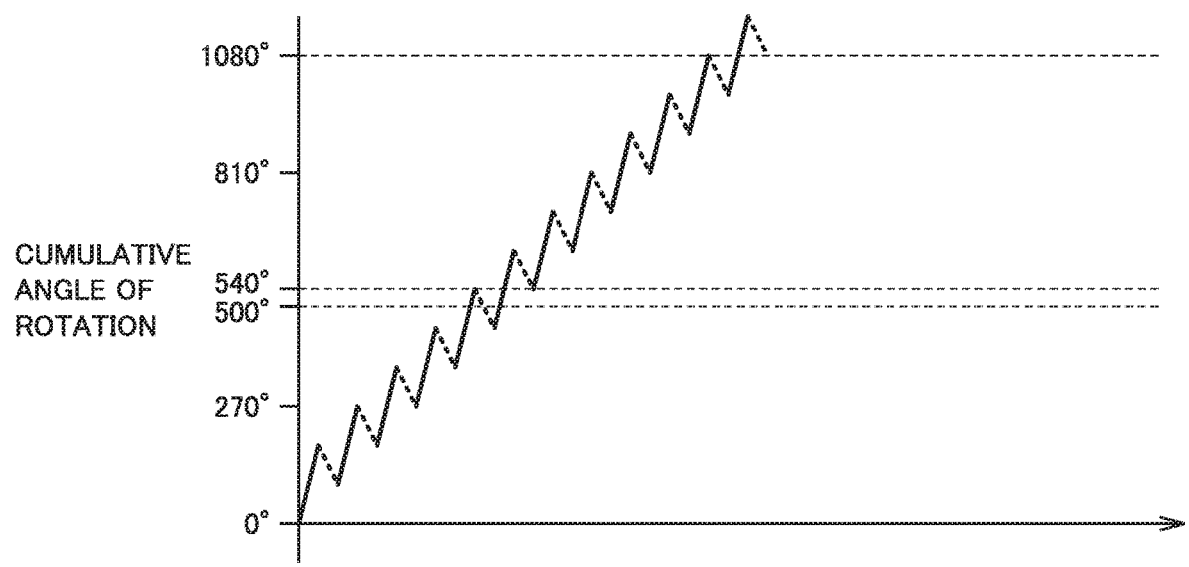
FIG. 3 is a diagram for illustrating change in cumulative angle of rotation in drive in twist drive.

An example of continued drive in accordance with a drive sequence called twist drive (reciprocating drive) will be described. FIG. 3 is a diagram for illustrating change in cumulative angle of rotation in drive in twist drive. In twist drive, drive for rotating the cutting tool by 180 degrees in the forward direction and 90 degrees in the reverse direction is repeated. Therefore, when twist drive of the cutting tool is continued as shown in FIG. 3, a cumulative angle of rotation increases by 90 degrees each time the cutting tool is driven once. Therefore, when the cutting tool is driven six times, the cumulative angle of rotation attains to 540 degrees and exceeds 500 degrees as the set value.

In the drive sequence shown in FIG. 2, on the other hand, the cumulative angle of rotation increases in the drive pattern under SET1 and the cumulative angle of rotation decreases in the drive pattern under SET2. Therefore, in the root canal treatment instrument driven under that drive sequence, the cumulative angle of rotation does not exceed the set value as in twist drive and torsional fracture of the cutting tool does not occur.

Relation between a type and a fracture angle of a cutting tool will be described. FIG. 4 is a diagram for illustrating relation of a manufacturer and a diameter with a fracture angle of a cutting tool. FIG. 4 shows a fracture angle of each of #15 (a diameter of 0.15 mm) to #40 (a diameter of 0.40 mm) of a company A to a company F. A material or a shape of a cutting tool is different for each company, and even cutting tools identical in size are different in fracture angle. For example, there is a great difference between thin cutting tools of #15 of a company B and a company C, with 640 degrees in the cutting tool of company B and 1210 degrees in the cutting tool of company C.

In FIG. 4, a fracture angle of a cutting tool of #30 of company A and a fracture angle of a cutting tool of #20 of a company E are 510 degrees. When a tip end of the cutting tool is restrained and forced to rotate by 510 degrees, the cutting tool may be twisted to break, When twist drive is continued as shown in FIG. 3, rotation by an angle around 510 degrees with the tip end of the cutting tool being bit may frequently occur, and a difficult manipulation of a cutting tool for preventing the tip end thereof from being bitten has been required.

Drive for reversing rotation while a load applied to a cutting tool is equal to or higher than a certain reference value has been known as drive for preventing torsional fracture of the cutting tool. In the root canal treatment instrument according to the present first embodiment, however, drive is restricted by an angle of rotation rather than a load applied to the cutting tool. Control in the present first embodiment is rotation angle limiter control in which rotation equal to or greater than a fracture angle is not allowed with attention being paid to the fracture angle, instead of load limiter control in which a load applied to the cutting tool is set as a limiter. A reference value in rotation angle limiter control is set as the set value, and the set value is set, for example, to 500 degrees smaller than 510 degrees representing the smallest fracture angle shown in FIG. 4. The root canal treatment instrument does not rotate the cutting tool to such an extent that a cumulative angle of rotation exceeds the fracture angle, by setting the set value to 500 degrees. In a drive sequence under rotation angle limiter control, control for repeating forward rotation drive and reverse rotation drive is carried out such that a cumulative amount of rotation from a position of start of drive of the cutting tool is smaller than the set value (a value set based on a predetermined angle of break).

The root canal treatment instrument according to the present first embodiment performs drive by repeating a drive sequence including drive patterns under SET1 and SET2 shown in FIG. 2. In the drive pattern under SET1, an angle of forward rotation of $\alpha1=180$ degrees, an angle of reverse rotation of $\beta1=90$ degrees, the number of times of repetition of n=4, and a cumulative angle of rotation=360 degrees are set. In the drive pattern under SET2, an angle of forward rotation of $\beta2=90$ degrees, an angle of reverse rotation of $\alpha2=180$ degrees, the number of times of repetition of n=4, and a cumulative angle of rotation=−360 degrees are set. The cumulative angle of rotation is expressed, with an angle of rotation in the forward direction being expressed as a positive value and an angle of rotation in the reverse direction being expressed as a negative value.

Though the drive patterns under SET1 and SET2 are identical in absolute value of the cumulative angle of rotation of 360 degrees, they are different from each other in sign. Therefore, even though the drive pattern under SET1 and the drive pattern under SET2 are repeatedly continued, the cumulative angle of rotation attains to 0 (zero) degree and the cutting tool does not rotate beyond the fracture angle.

Though control with attention being paid to the cumulative angle of rotation is described above, possibility of fracture can further be lowered by setting each angle ($\alpha1$, $\beta1$, $\alpha2$, and $\beta2$) defining each SET or each sequence to a small value (for example, 60 degrees, 45 degrees, and the like). In this case, in order to avoid lowering in efficiency in cutting, such measures as increase in number of times of repetition (n) in each SET can also be taken.

A configuration of a dental treatment apparatus according to the present first embodiment will now be described. A root canal treatment instrument includes a root canal enlargement and root canal length measurement system incorporating a handpiece for dental root canal treatment according to the present first embodiment. The dental treatment apparatus according to the present invention, however, is not limited to the root canal treatment instrument but is applicable to a similarly configured dental treatment apparatus. Though a root canal treatment instrument including a root canal length measurement system will be described, a root canal treatment instrument only for enlargement of a root canal may be applicable.

[Configuration of Dental Treatment Apparatus]

Figure 5:
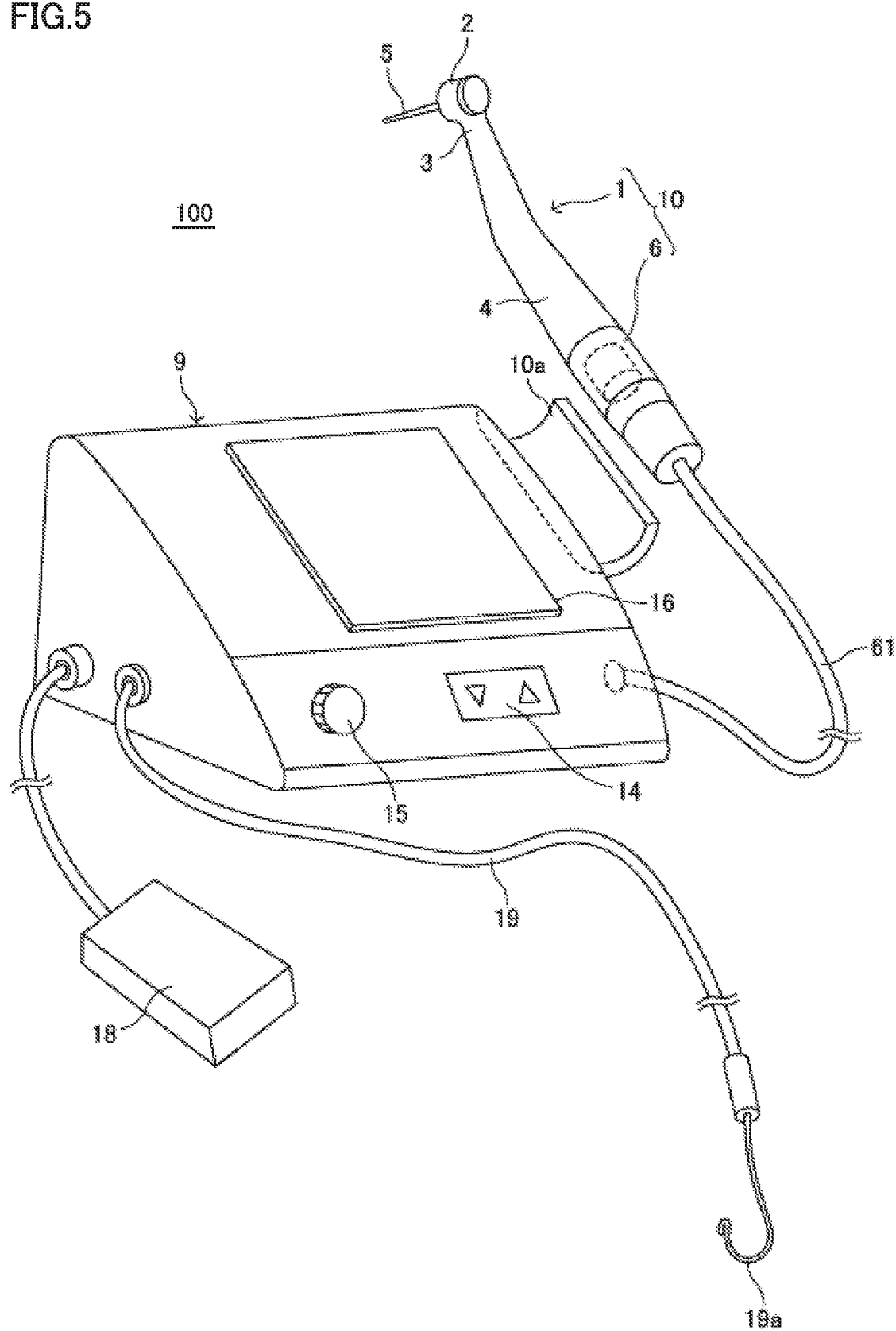
FIG. 5 is a schematic diagram showing a feature of appearance of the root canal treatment instrument according to the present first embodiment.
Figure 6:
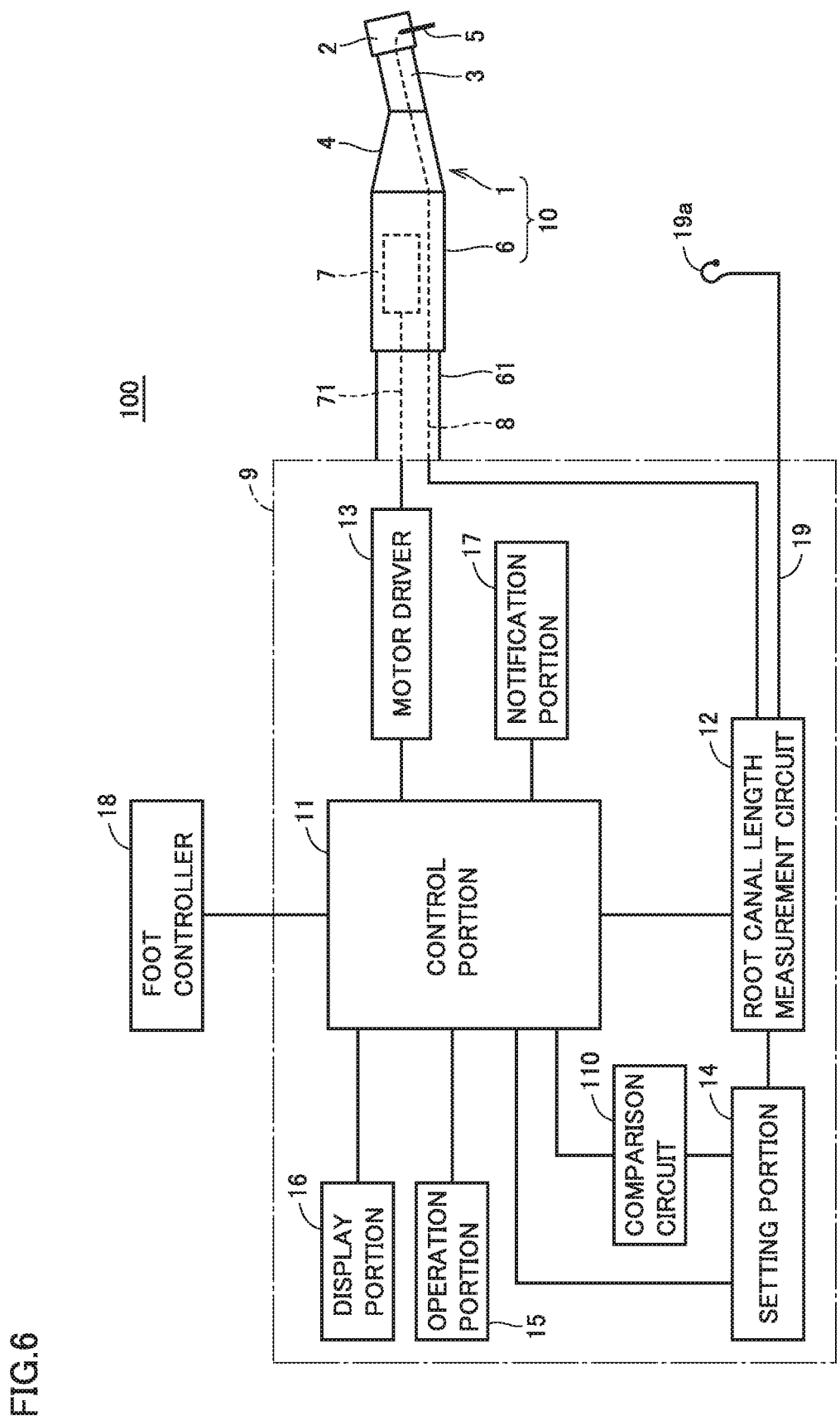
FIG. 6 is a block diagram showing a functional configuration of the root canal treatment instrument according to the present first embodiment.

FIG. 5 is a schematic diagram showing a feature of appearance of the root canal treatment instrument according to the present first embodiment. FIG. 6 is a block diagram showing a functional configuration of the root canal treatment instrument according to the present first embodiment. A root canal treatment instrument 100 shown in FIG. 5 includes a handpiece 1 for dental root canal treatment, a motor unit 6, and a control box 9.

Handpiece 1 for dental root canal treatment includes a head 2, a neck portion 3 small in diameter and continuous to head 2, and a grip portion 4 continuous to neck portion 3 and gripped with fingers. Motor unit 6 for rotatably driving cutting tool 5 (a file or a reamer) held by head 2 is removably connected to a base portion of grip portion 4. A dental instrument 10 is constructed with motor unit 6 being coupled to handpiece 1.

As shown in FIG. 6, motor unit 6 contains a micromotor 7 and is coupled to control box 9 through a power supply lead 71 supplying power to micromotor 7 and a hose 61 containing a signal lead 8 transmitting a signal to a root canal length measurement circuit 12 which will be described later. Signal lead 8 is a part of a conductor electrically connected to cutting tool 5 with motor unit 6 and handpiece 1 being interposed and transmitting an electric signal. Cutting tool 5 serves as one electrode of root canal length measurement circuit 12.

Control box 9 includes a control portion 11, a comparison circuit 110, a root canal length measurement circuit 12, a motor driver 13, a setting portion 14, an operation portion 15, a display portion 16, and a notification portion 17. As shown in FIG. 5, a holder 10a for holding instrument 10 while the instrument is not used is attached to control box 9 in a side portion of a main body. In control box 9, a foot controller 18 is coupled to control portion 11 and a lead 19 is coupled to root canal length measurement circuit 12. Though lead 19 is pulled out of control box 9, it may be pulled out as being branched from a point intermediate in hose 61. A mouth cavity electrode 19a placed over a lip of a patient is attached to a tip end of lead 19 as being electrically connected. Mouth cavity electrode 19a serves as the other electrode of root canal length measurement circuit 12.

Control portion 11 is responsible for overall control of the root canal enlargement and root canal length measurement system and a main portion thereof is implemented by a microcomputer. Comparison circuit 110, root canal length measurement circuit 12, motor driver 13, setting portion 14, operation portion 15, display portion 16, notification portion 17, and foot controller 18 are connected to control portion 11. Control portion 11 controls a direction of rotation of cutting tool 5 cutting a treatment portion. Specifically, control portion 11 controls drive to any of forward rotation drive for rotating cutting tool 5 in the forward direction (clockwise (also called right rotation)) and reverse rotation drive for rotating cutting tool 5 in the reverse direction (counterclockwise (also called left rotation)) in accordance with the drive sequence. A direction of rotation of the cutting tool (clockwise or counterclockwise) is discussed with the direction from the side of cutting tool 5 attached to head 2 toward the tip end of cutting tool 5 being defined as the reference. Control portion 11 can control drive for rotating cutting tool 5 with parameters including an angle of rotation, a rotation speed, or an angular rotation speed (the number of rotations) in the clockwise direction and an angle of rotation, a rotation speed, or an angular rotation speed (the number of rotations) in the counterclockwise direction being changed. The number of times of repetition refers, for example, to the number of times of repetition of drive for rotating the cutting tool by 180 degrees in the forward direction and 90 degrees in the reverse direction under the drive sequence shown in FIG. 2, and it is set to four.

An angle of rotation refers to an amount of rotation representing an extent of rotation of cutting tool 5 clockwise or counterclockwise, and it may be defined by a time period for rotation (also called a time period for drive) when the number of times of rotation or an angular rotation speed (the number of rotations) is constant. An angle of rotation may be defined by an amount associated with drive of cutting tool 5 such as an amount of a drive current or an amount of torque. Though description will be given herein with reference to an angle of rotation, it may be replaced with the number of times of rotation. For example, setting the number of times of rotation of cutting tool 5 to ½ rotation is the same in meaning as rotation of cutting tool 5 by 180 degrees. Drive of cutting tool 5 for 0.25 second with a rotation speed of cutting tool 5 being constant at 120 rotations per minute is the same in meaning as rotation of cutting tool 5 by 180 degrees. Strictly speaking, for example, correspondence between a time period for rotation in terms of control and an actual angle of rotation may have to be corrected depending on a load applied to the cutting tool or the motor, however, an amount of correction is extremely small and hence it is ignorable in carrying out the present invention.

Comparison circuit 110 is necessary for detecting a load applied to cutting tool 5 and can selectively be provided when detection of the load is necessary. Comparison circuit 110 can compare a load at any time point during rotation of cutting tool 5 clockwise or counterclockwise by motor driver 13. Specifically, comparison circuit 110 can compare a load applied to cutting tool 5 with a reference load after cutting tool 5 is rotated by a prescribed angle of rotation (for example, 180 degrees) clockwise or counterclockwise.

Root canal length measurement circuit 12 is necessary for detecting a position of a tip end of cutting tool 5 in a root canal, and can selectively be provided when detection of the position is necessary. Root canal length measurement circuit 12 forms a closed circuit with cutting tool 5 inserted in a root canal of a tooth being defined as one electrode and mouth cavity electrode 19a placed over a lip of a patient being defined as the other electrode. Root canal length measurement circuit 12 can measure a distance from a position of a root apex of a tooth to the tip end of cutting tool 5 by measuring an impedance between cutting tool 5 and mouth cavity electrode 19a by applying a measurement voltage across cutting tool 5 and mouth cavity electrode 19a. When root canal length measurement circuit 12 detects the tip end of cutting tool 5 reaching the position of the root apex, an amount of insertion of the cutting tool, that is, the distance from a mouth of the root canal to the tip end of the cutting tool, can be defined as a root canal length. An electric root canal length measurement method for measuring a root canal length by measuring an impedance between cutting tool 5 and mouth cavity electrode 19a has been known, and all known electric root canal length measurement methods are applicable to root canal treatment instrument 100 according to the first embodiment.

Motor driver 13 is connected to micromotor 7 through power supply lead 71 and controls power supplied to micromotor 7 based on a control signal from control portion 11. Motor driver 13 can control a direction of rotation, the number of rotations, and an angle of rotation of micromotor 7, that is, a direction of rotation, the number of rotations, and an angle of rotation of cutting tool 5, by controlling power supplied to micromotor 7. The drive portion is constituted mainly of micromotor 7 and motor driver 13.

Setting portion 14 sets the reference for controlling a direction of rotation, the number of rotations, and an angle of rotation of cutting tool 5. Setting portion 14 sets a switch criterion to be compared by comparison circuit 110 with a load applied to cutting tool 5 (a criterion for switching a parameter of a drive sequence or a drive pattern), a reference load, and timing. Setting portion 14 can set in advance with root canal length measurement circuit 12, a position of a root apex as the reference position and a position at a prescribed distance from the position of the root apex as a switch position (a criterion for switching a parameter of a drive sequence or a drive pattern). Root canal treatment instrument 100 can change a parameter including a direction of rotation, the number of rotations, and an angle of rotation of cutting tool 5 when the tip end of cutting tool 5 reaches the reference position, by setting the reference position in advance with setting portion 14.

Operation portion 15 sets a parameter including the number of rotations and an angle of rotation of cutting tool 5 and can also set selection as to whether or not to measure a root canal length. Operation portion 15 can allow manual switching of a drive sequence or a drive pattern, switching between forward rotation drive and reverse rotation drive, or switching between forward rotation drive and twist drive.

As will be described later, display portion 16 shows a position of the tip end of cutting tool 5 in a root canal or a direction of rotation, the number of rotations, and an angle of rotation of cutting tool 5. Display portion 16 can also show information given from notification portion 17 to an operator.

Notification portion 17 gives a notification about a state of drive of cutting tool 5 currently caused by control portion 11 through light, sound, or vibration. Specifically, notification portion 17 is provided with a light emitting diode (LED), a speaker, or an oscillator as necessary for giving a notification about a state of drive of cutting tool 5, and changes a color of the LED emitting light or changes sound output from the speaker between forward drive and reverse drive. When display portion 16 can show a state of drive of cutting tool 5 to an operator, notification portion 17 does not have to separately include an LED, a speaker, or an oscillator.

Foot controller 18 is an operation portion with which drive and control of cutting tool 5 by micromotor 7 is indicated through a stepping operation. Drive and control of cutting tool 5 by micromotor 7 is not limited to drive and control with foot controller 18. An operation switch (not shown) may be provided in grip portion 4 of handpiece 1 and cutting tool 5 may be driven and controlled by using both of the operation switch and foot controller 18. For example, when root canal length measurement circuit 12 detects insertion of cutting tool 5 into a root canal while an operation to step on foot controller 18 is performed, rotation of cutting tool 5 may be started.

Though control box 9 of root canal treatment instrument 100 is used as being placed on a tray table or a side table set at a side portion of a dental treatment couch, the present invention is not limited as such and control box 9 may be incorporated in the tray table or the side table.

Figure 7:
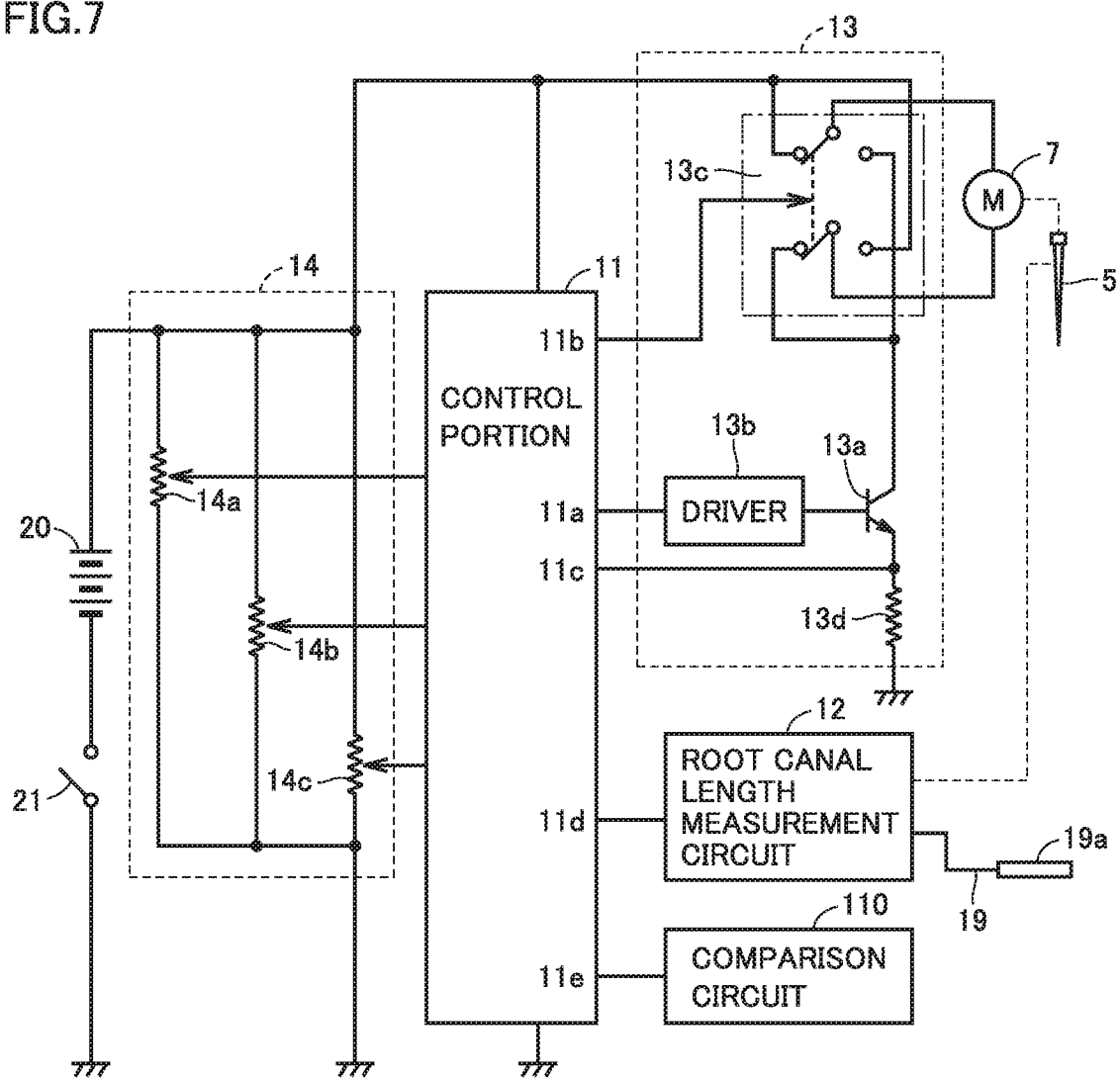
FIG. 7 is a circuit diagram showing a circuit configuration of the root canal treatment instrument according to the present first embodiment.

A circuit configuration of root canal treatment instrument 100 driving and controlling cutting tool 5 will now be described in further detail. FIG. 7 is a circuit diagram showing a circuit configuration of root canal treatment instrument 100 according to the present first embodiment. In connection with root canal treatment instrument 100 shown in FIG. 7, micromotor 7 involved with drive and control of cutting tool 5, control portion 11, comparison circuit 110, root canal length measurement circuit 12, motor driver 13, and setting portion 14 are shown.

Motor driver 13 includes a transistor switch 13a, a transistor driver circuit 13b, a rotation direction switch 13c, and a load detection resistor 13d. Though rotation direction switch 13c is described as a relay element, a motor drive circuit may be configured with a semiconductor switching element such as an FET. Setting portion 14 includes a reference load setting variable resistor 14a, a duty setting variable resistor 14b, and a reference position setting variable resistor 14c. Though setting portion 14 includes also a feature setting an angle of rotation (or a time period for rotation) indicating timing of comparison between a detected load and a reference load by comparison circuit 110, FIG. 7 does not show such a feature. Root canal treatment instrument 100 shown in FIG. 7 is connected to a main power supply 20 and a main switch 21. Cutting tool 5 is held by micromotor 7 with an appropriate gear mechanism being interposed, although it is not shown.

Transistor driver circuit 13b is activated by a control signal output from a port 11a of control portion 11, controls on and off of transistor switch 13a, and drives micromotor 7. Micromotor 7 rotates clockwise or counterclockwise in accordance with a state of rotation direction switch 13c. When a control signal output from port 11a of control portion 11 has a waveform of pulses, for example, as being repeated in a certain period, a width of the waveform of the pulses, that is, a duty ratio, is adjusted by duty setting variable resistor 14b of setting portion 14. Micromotor 7 drives cutting tool 5 at the number of rotations corresponding to the duty ratio.

Rotation direction switch 13c switches between drive of cutting tool 5 in the clockwise direction and drive in the counterclockwise direction in accordance with a control signal output from a port 11b of control portion 11. Control portion 11 detects a load applied to cutting tool 5 based on an amount of a current (or a voltage value) from load detection resistor 13d input to a port 11c. Therefore, load detection resistor 13d functions as a load detector detecting a load applied to cutting tool 5. The load detector is not limited to a feature detecting a load applied to cutting tool 5 based on an amount of a current (or a voltage value) from load detection resistor 13d, but may be implemented by another feature such as a feature detecting a load applied to cutting tool 5 by providing a torque sensor in a portion driving cutting tool 5. A detected load is converted, for example, into a value for torque applied to cutting tool 5 by control portion 11 and shown on display portion 16. Comparison circuit 110 compares the torque value resulting from conversion by control portion 11 with a torque value set by reference load setting variable resistor 14a. Comparison circuit 110 may naturally directly compare an amount of a current (or a voltage value) from load detection resistor 13d with an amount of a current (or a voltage value) from variable resistor 14a without conversion into a torque value.

Control portion 11 receives input of a root canal length measured with root canal length measurement circuit 12 at a port 11d. Therefore, root canal length measurement circuit 12 functions as a position detector detecting a position of the tip end of cutting tool 5 in a root canal. Control portion 11 outputs a load applied to cutting tool 5 and detected by the load detector from a port 11e to comparison circuit 110, and receives input of a result of comparison resulting from comparison with the reference load by comparison circuit 110 at port 11e. Therefore, comparison circuit 110 functions as a load comparison portion comparing a load detected by the load detector with the reference load. Control portion 11 may be configured such that the features described as analog circuits may be integrated as software in one micro computer.

Figure 8:
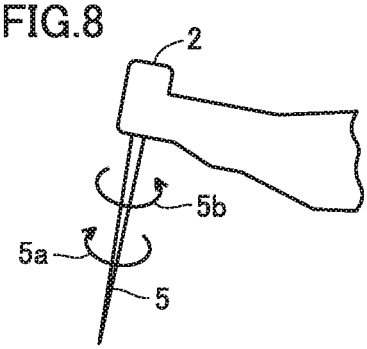
FIG. 8 is a schematic diagram showing a direction of rotation of a cutting tool.

FIG. 8 is a schematic diagram showing a direction of rotation of cutting tool 5. In connection with the direction of rotation of cutting tool 5 shown in FIG. 8, drive in a clockwise direction 5a in which cutting tool 5 is rotated to the right when viewed from the side of cutting tool 5 attached to head 2 toward the tip end of cutting tool 5 and drive in a counterclockwise direction 5b in which the cutting tool is rotated to the left are shown. Such drive that drive for rotating cutting tool 5 clockwise 5a by a predetermined angle of rotation and drive for rotating cutting tool 5 counterclockwise 5b by a predetermined angle of rotation are alternately performed is defined as twist drive.

Figure 9:
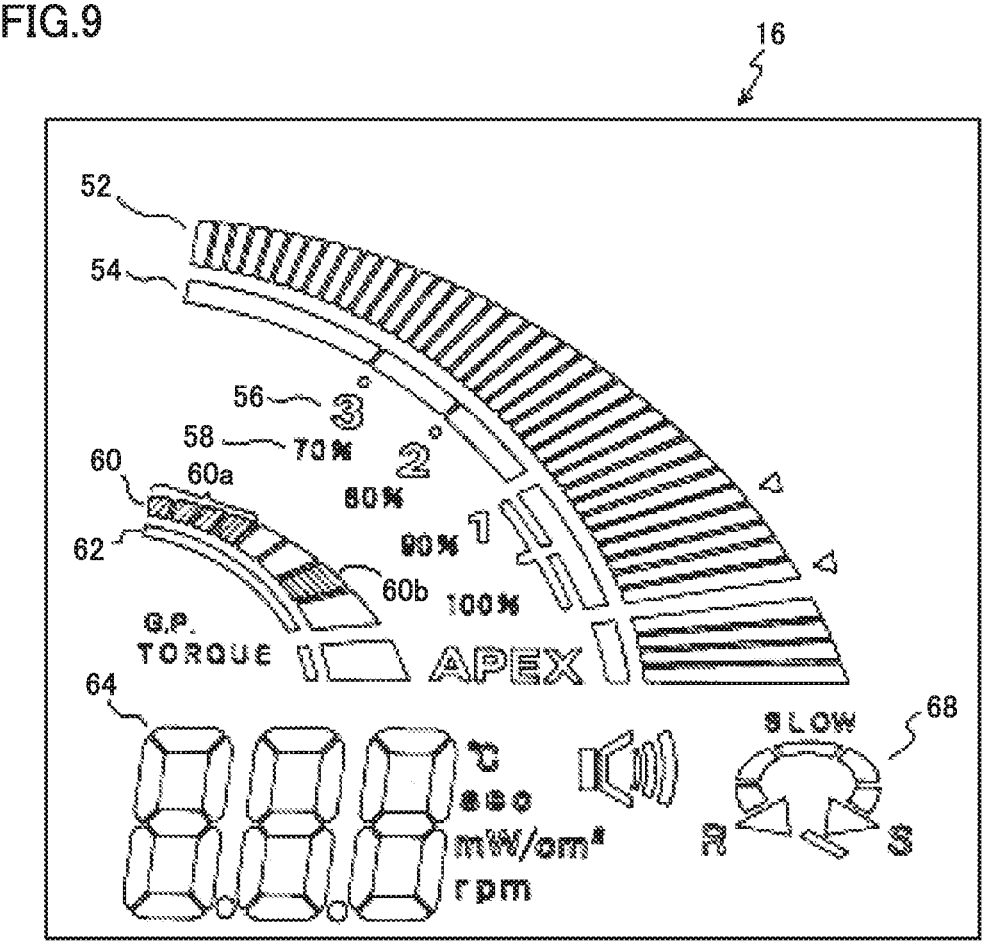
FIG. 9 is a diagram showing an example of representation on a liquid crystal display panel provided in a display portion shown in FIG. 5.

Representation on a liquid crystal display panel provided in display portion 16 shown in FIG. 5 will now be described. FIG. 9 is a diagram showing an example of representation on a liquid crystal display panel provided in display portion 16 shown in FIG. 5.

Display portion 16 shown in FIG. 9 is implemented by a liquid crystal display panel, and includes a dot display portion 52 including a number of elements for showing a measured root canal length in detail, a zone display portion 54 for showing stepwise a root canal length in a plurality of divided zones, a boundary display portion 56 showing a boundary between zones, and a proximity display portion 58 showing proximity to a root apex as a ratio.

Dot display portion 52 shows elements sequentially downward from the top as the tip end of cutting tool 5 is closer to the root apex. A position indicated by a mark "APEX" indicates a position of the root apex, and the element reaching the mark indicates that the tip end of cutting tool 5 has substantially reached the position of the root apex.

Display portion 16 includes a dot display portion 60 including a number of elements for showing a load detected by the load detector (load detection resistor 13d, see FIG. 7) and a zone display portion 62 for showing stepwise a load in a plurality of divided zones. Dot display portion 60 shows elements sequentially downward from the top as a load detected by the load detector is higher.

For example, dot display portion 60 shows with an element 60a shown with hatching, a load on cutting tool 5 applied when a tooth is cut. Dot display portion 60 may have a peak holding function in order to prevent representation from frequently changing and it may show for a certain period of time, a maximum value for the load detected within a prescribed period of time.

Dot display portion 60 may show an element 60b corresponding to the reference load set by setting portion 14 (see FIG. 7). By showing element 60b on dot display portion 60, how much margin is left for a load detected by the load detector with respect to the reference load can be visualized.

Display portion 16 further includes a numeric value display portion 64 showing the number of rotations of cutting tool 5 or a load applied to cutting tool 5 with a numeric value and a rotary display portion 68 showing a direction of rotation of cutting tool 5 (clockwise or counterclockwise) and magnitude of the number of rotations of cutting tool 5.

In root canal treatment instrument 100 according to the present first embodiment, cutting tool 5 attached to head 2 is driven in accordance with a drive sequence set in advance in control portion 11. Cutting tool 5 is driven under the drive sequence such that the cumulative angle of rotation does not exceed the set value as shown in FIG. 2. In the drive sequence shown in FIG. 2, two drive patterns (SET1 and SET2) identical in cumulative angle of rotation but different in direction are combined, and hence specifications of the sequence are such that the cutting tool returns to the same position as a position of start of drive.

The drive sequence performed in root canal treatment instrument 100 according to the present first embodiment is not limited to the drive sequence shown in FIG. 2. Any sequence may be applicable so long as a cumulative amount of rotation which is an accumulation of an amount of rotation in forward rotation drive and an amount of rotation in reverse rotation drive does not exceed the set value at any time point when the drive portion is controlled in accordance with the drive sequence. A modification of the drive sequence performed in root canal treatment instrument 100 according to the present first embodiment will be described below.

Figure 10:
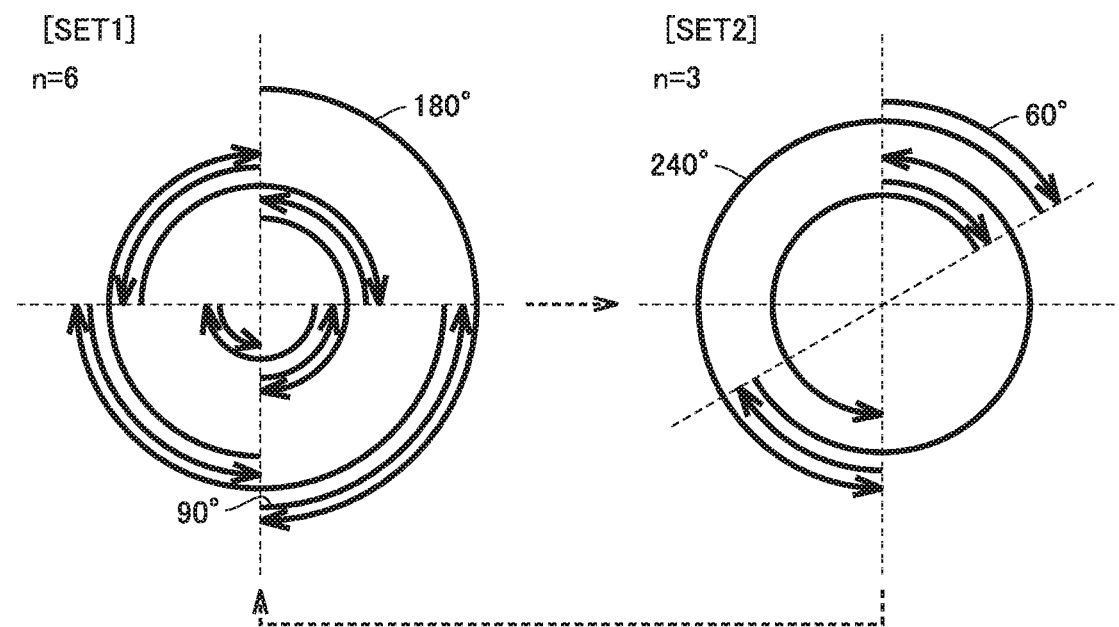
FIG. 10 is a diagram for illustrating a first modification of the drive sequence to be used for the root canal treatment instrument according to the present first embodiment.

FIG. 10 is a diagram for illustrating a first modification of the drive sequence to be used for the root canal treatment instrument according to the present first embodiment. The drive sequence shown in FIG. 10 consists of drive patterns under SET1 and SET2. After SET1 is performed, SET2 is performed. After SET2 is performed, the drive pattern returns to SET1. Thereafter, SET1 and SET2 are alternately repeatedly performed. The drive pattern under SET1 is implemented by repeating six times drive for rotating the cutting tool by 180 degrees in the forward direction and 90 degrees in the reverse direction. In the drive pattern under SET1, each time drive in the forward direction and drive in the reverse direction are performed, the cumulative angle of rotation increases by 90 degrees and the cumulative angle of rotation attains to 540 degrees after repetition six times. When drive under the drive sequence shown in FIG. 10 is performed, the set value is set, for example, to 600 degrees. The drive pattern under SET2 is implemented by repeating three times drive for rotating the cutting tool by 60 degrees in the forward direction and 240 degrees in the reverse direction. In the drive pattern under SET2, each time drive in the forward direction and drive in the reverse direction are performed once, a cumulative angle of rotation decreases by 180 degrees and the cumulative angle of rotation attains to −540 degrees after repetition three times. Therefore, the cumulative angle of rotation attains to 0 (zero) degree in the drive sequence shown in FIG. 10 by driving cutting tool 5 in the drive patterns under SET1 and SET2. In the drive sequence shown in FIG. 10, a cumulative angle of rotation in each of the plurality of drive patterns included in the sequence does not exceed the set value, a value of the sum of cumulative angles of rotation in the plurality of drive patterns does not exceed the set value, and furthermore, an angle of rotation in forward rotation drive and an angle of rotation in reverse rotation drive do not exceed the set value.

Figure 11:
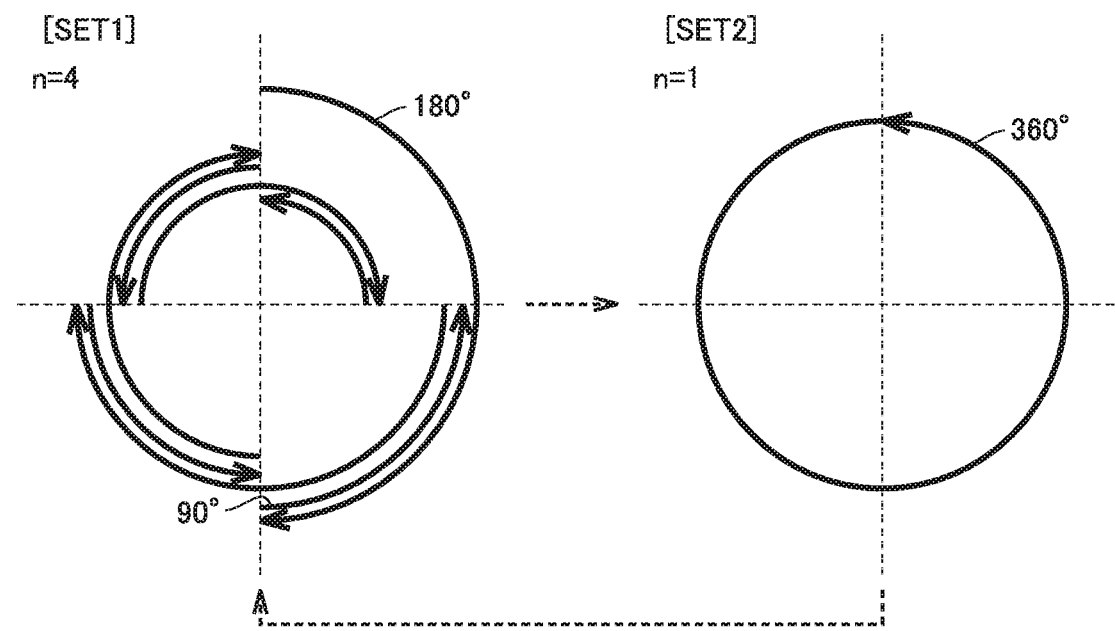
FIG. 11 is a diagram for illustrating a second modification of the drive sequence to be used for the root canal treatment instrument according to the present first embodiment.

FIG. 11 is a diagram for illustrating a second modification of the drive sequence to be used for the root canal treatment instrument according to the present first embodiment. The drive sequence shown in FIG. 11 consists of drive patterns under SET1 and SET2. After SET1 is performed, SET2 is performed. After SET2 is performed, the drive pattern returns to SET1. Thereafter, SET1 and SET2 are alternately repeatedly performed. The drive pattern under SET1 is implemented by repetition four times of drive for rotating the cutting tool by 180 degrees in the forward direction and 90 degrees in the reverse direction. In the drive pattern under SET1, each time drive in the forward direction and drive in the reverse direction are performed once, a cumulative angle of rotation increases by 90 degrees and the cumulative angle of rotation attains to 360 degrees after repetition four times. When drive under the drive sequence shown in FIG. 11 is performed, the set value is set, for example, to 500 degrees. The drive pattern under SET2 is implemented by drive for rotating the cutting tool by 0 degree once in the forward direction and 360 degrees in the reverse direction. In the drive pattern under SET2, cutting tool 5 is rotated by 360 degrees in the reverse direction when the cutting tool is driven once. Therefore, in the drive sequence shown in FIG. 11, the cumulative angle of rotation attains to 0 (zero) degree by driving cutting tool 5 in the drive patterns under SET1 and SET2. In the drive sequence shown in FIG. 11, a cumulative angle of rotation in each of the plurality of drive patterns included in the drive sequence does not exceed the set value, a value of the sum of cumulative angles of rotation in the plurality of drive patterns does not exceed the set value, and furthermore, an angle of rotation in forward rotation drive and an angle of rotation in reverse rotation drive do not exceed the set value.

FIG. 12 is a diagram for illustrating a third modification of the drive sequence to be used for the root canal treatment instrument according to the present first embodiment. The drive sequence shown in FIG. 12 consists of drive patterns under SET1 and SET2. After SET1 is performed, SET2 is performed. After SET2 is performed, the drive pattern returns to SET1. Thereafter, SET1 and SET2 are alternately repeatedly performed. Each of the drive patterns under SET1 and SET2 implements a single drive pattern by combining three types of drive. In the drive pattern under SET1, drive A in which the cutting tool is rotated by 180 degrees in the forward direction and 90 degrees in the reverse direction is repeated two times, drive B in which the cutting tool is rotated by 90 degrees in the forward direction and 180 degrees in the reverse direction is repeated twice, and drive C in which the cutting tool is rotated by 90 degrees in the reverse direction is performed once. In the drive pattern under SET1, a cumulative angle of rotation in drive A attains to 180 degrees, a cumulative angle of rotation in drive B attains to −180 degrees, and a cumulative angle of rotation in drive C attains to −90 degrees. Therefore, consequently, the cumulative angle of rotation attains to −90 degrees. When drive under the drive sequence shown in FIG. 12 is performed, the set value is set, for example, to 500 degrees. In the drive pattern under SET2, drive A in which the cutting tool is rotated by 180 degrees in the forward direction and 90 degrees in the reverse direction is repeated two times, drive B in which the cutting tool is rotated by 90 degrees in the forward direction and 180 degrees in the reverse direction is repeated twice, and drive D in which the cutting tool is rotated by 90 degrees in the forward direction is performed once. In the drive pattern under SET2, a cumulative angle of rotation in drive A attains to 180 degrees, a cumulative angle of rotation in drive B attains to −180 degrees, and a cumulative angle of rotation in drive D attains to 90 degrees. Therefore, consequently, the cumulative angle of rotation attains to 90 degrees. Therefore, in the drive sequence shown in FIG. 12, the cumulative angle of rotation attains to 0 (zero) degree by driving cutting tool 5 in the drive patterns under SET1 and SET2. In the drive sequence shown in FIG. 12, a cumulative angle of rotation in each of the plurality of drive patterns included in the drive sequence does not exceed the set value, a value of the sum of cumulative angles of rotation in the plurality of drive patterns does not exceed the set value, and furthermore, an angle of rotation in forward rotation drive and an angle of rotation in reverse rotation drive do not exceed the set value.

Figure 13:
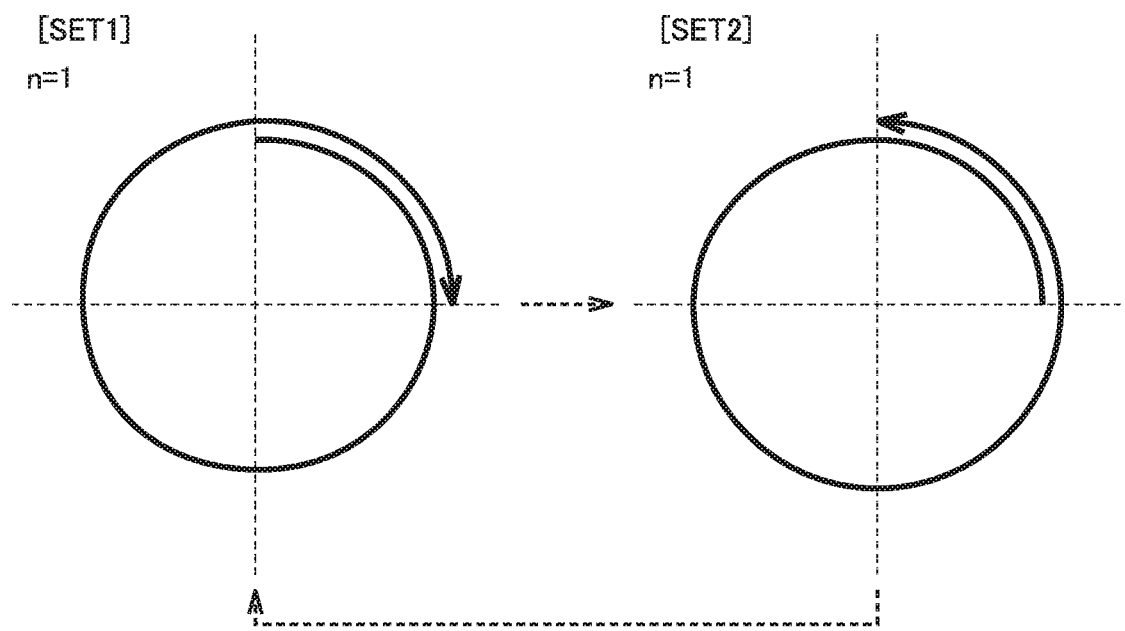
FIG. 13 is a diagram for illustrating a fourth modification of the drive sequence to be used for the root canal treatment instrument according to the present first embodiment.

FIG. 13 is a diagram for illustrating a fourth modification of the drive sequence to be used for the root canal treatment instrument according to the present first embodiment. The drive sequence shown in FIG. 13 consists of drive patterns under SET1 and SET2. After SET1 is performed, SET2 is performed. After SET2 is performed, the drive pattern returns to SET1. Thereafter, SET1 and SET2 are alternately repeatedly performed. In the drive pattern under SET1, drive in which the cutting tool is rotated by 450 degrees in the forward direction and 0 degree in the reverse direction is performed once, and a cumulative angle of rotation is 450 degrees. When drive under the drive sequence shown in FIG. 13 is performed, the set value is set, for example, to 500 degrees. In the drive pattern under SET2, drive in which the cutting tool is rotated by 0 degree in the forward direction and 450 degrees in the reverse direction is performed once, and a cumulative angle of rotation attains to −450 degrees. Therefore, in the drive sequence shown in FIG. 13, a cumulative angle of rotation attains to 0 (zero) degree by driving cutting tool 5 in the drive patterns under SET1 and SET2. In the drive sequence shown in FIG. 13, a cumulative angle of rotation in each of the plurality of drive patterns included in the drive sequence does not exceed the set value, a value of the sum of cumulative angles of rotation in the plurality of drive patterns does not exceed the set value, and furthermore, an angle of rotation in forward rotation drive and an angle of rotation in reverse rotation drive do not exceed the set value.

As set forth above, the drive sequence controlled by root canal treatment instrument 100 according to the present first embodiment includes at least one forward rotation drive in which cutting tool 5 is rotated in the cutting direction to cut a treatment portion and at least one reverse rotation drive in which cutting tool 5 is rotated in the non-cutting direction. When root canal treatment instrument 100 controls the drive portion in accordance with the drive sequence, root canal treatment instrument 100 controls the drive portion such that a cumulative angle of rotation which is an accumulation of an angle of rotation in the forward rotation drive and an angle of rotation in the reverse rotation drive does not exceed a set value at any time point. Therefore, in root canal treatment instrument 100 according to the present first embodiment, cutting tool 5 is not rotated beyond a fracture angle and fracture of cutting tool 5 due to torsional fracture can be prevented.

From a different point of view, the drive sequence controlled by root canal treatment instrument 100 according to the present first embodiment can also be considered as repetition of forward rotation drive for rotating cutting tool 5 in the cutting direction to cut a treatment portion and reverse rotation drive for rotating cutting tool 5 in the non-cutting direction such that a cumulative angle of rotation from a position of start of drive of cutting tool 5 is smaller than a value (for example, 500 degrees) set based on a predetermined angle of break at any time point.

The drive sequence may include a plurality of drive patterns including at least one of forward rotation drive and reverse rotation drive. The drive pattern includes the first drive pattern (for example, SET1 in FIG. 2) in which a cumulative angle of rotation which is an accumulation of an angle of rotation in forward rotation drive and an angle of rotation in reverse rotation drive in the drive pattern attains to a value in the cutting direction and the second drive pattern (for example, SET2 in FIG. 2) in which the cumulative angle of rotation attains to a value in the non-cutting direction. Furthermore, control is carried out such that a cumulative angle of rotation in each of the plurality of drive patterns included in the drive sequence does not exceed the set value, a value of the sum of cumulative angles of rotation in the plurality of drive patterns does not exceed the set value, and furthermore, an angle of rotation in forward rotation drive and an angle of rotation in reverse rotation drive do not exceed the set value.

The drive sequence may be limited such that a value of the sum of the cumulative angle of rotation in the first drive pattern (for example, SET1 in FIG. 2) and the cumulative angle of rotation in the second drive pattern (for example, SET2 in FIG. 2) attains to zero or a value in the reverse direction (the non-cutting direction). In the drive sequence shown in FIG. 2, the cumulative angle of rotation in the drive pattern under SET1 is 360 degrees in the forward direction and the cumulative angle of rotation in the drive pattern under SET2 is 360 degrees in the reverse direction, and hence a value of the sum is 0 (zero). With the cumulative angle of rotation which is the sum in the drive sequence being 0 (zero), even though the drive portion is continuously controlled in accordance with the drive sequence, a cumulative amount of rotation does not exceed the set value at any time point. With the cumulative angle of rotation which is the sum in the drive sequence being a value in the reverse direction (a negative value), even though the drive portion is continuously controlled in accordance with the drive sequence, a cumulative amount of rotation does not exceed the set value in the forward direction at any time point.

Even in the drive sequence in which cutting tool 5 is driven only in the drive pattern under SET1 shown in FIG. 2, the cumulative angle of rotation does not exceed the set value while the cutting tool is driven once. Therefore, by eliminating bite of the cutting edge of cutting tool 5 into a wall of a root canal by an operation by an operator to pull out cutting tool 5 from the root canal each time the drive pattern under SET1 shown in FIG. 2 is driven once, fracture of cutting tool 5 due to torsional fracture can be prevented even though cutting tool 5 is driven under the drive sequence. The root canal treatment instrument has a function to stop driving or to give a notification about timing to pull cutting tool 5 out of a root canal by sound each time the drive pattern under SET1 is performed.

Root canal treatment instrument 100 according to the present first embodiment may be configured such that control portion 11 can accept input of at least one parameter of an angle of rotation in a plurality of drive patterns and the number of times of repetition of drive patterns. For example, in the drive pattern under SET1 shown in FIG. 2, control portion 11 may modify parameters of the drive pattern under SET1 by accepting input of parameters of an angle of forward rotation of $\alpha 1=270$ degrees, an angle of reverse rotation of $\beta 1=90$ degrees, and the number of times of repetition of n=2. Thus, a parameter of a drive pattern can be set in accordance with preference of an operator or a condition of a treatment portion.

Though a set value is set based on an angle of break of cutting tool 5, it does not have to be based on an angle of break of cutting tool 5 so long as it is smaller than the angle of break of cutting tool 5. For example, from a point of view of even cutting of a root canal, the set value may be set to 360 degrees.

In root canal treatment instrument 100 according to the present first embodiment, control portion 11 may have a set value different for each type of cutting tool 5 and may control switching of a drive sequence to be controlled. For example, as shown in FIG. 4, when #15 of company C is employed as cutting tool 5, control portion 11 changes the set value to 1200 degrees by inputting information on a type of cutting tool 5 and carries out control to switch to the drive sequence in which the number of times of repetition in the drive patterns under SET1 an SET2 shown in FIG. 2 is set to n=12.

(Second Embodiment)

Figure 14:
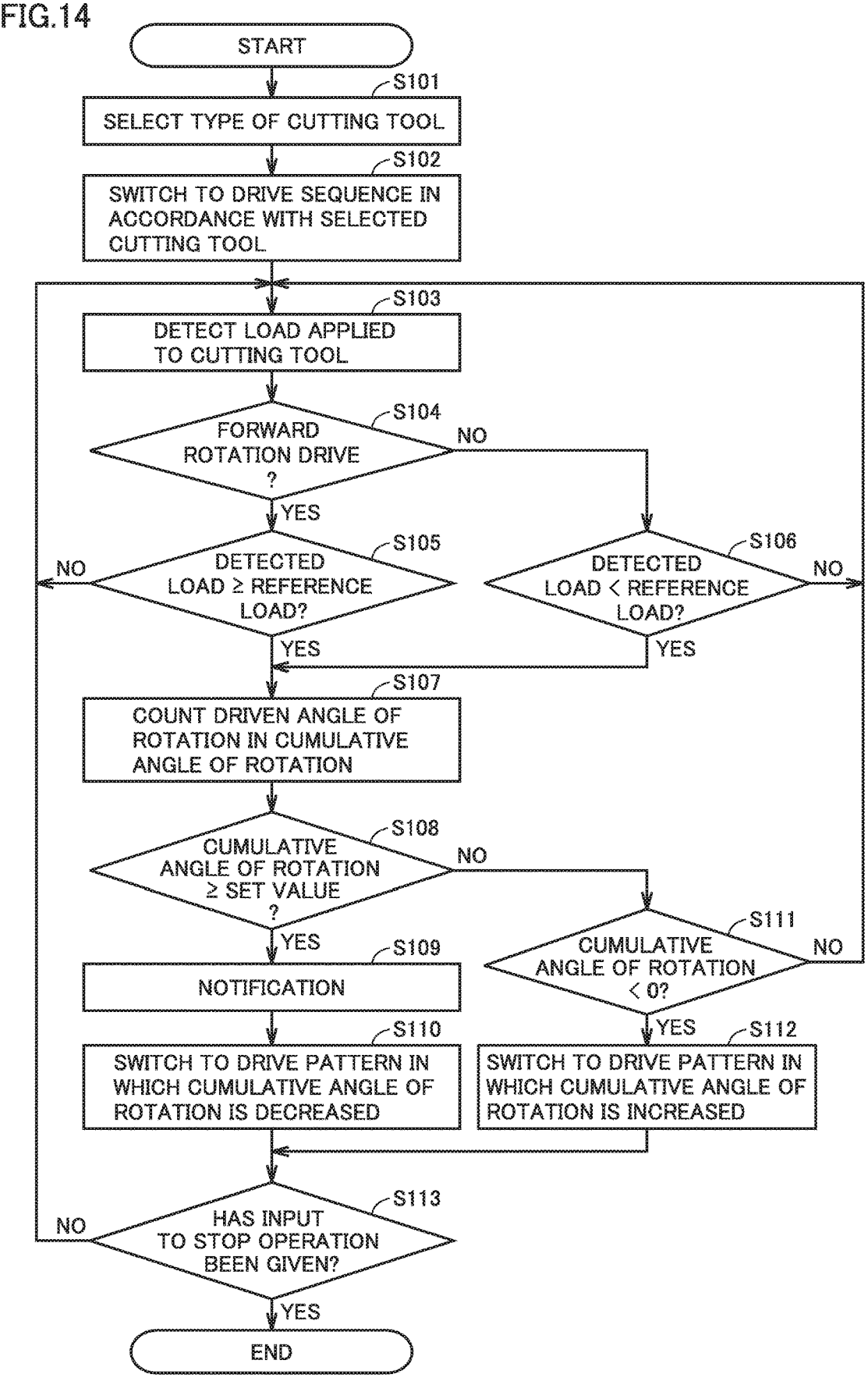
FIG. 14 is a flowchart for illustrating drive of the root canal treatment instrument according to the present second embodiment.

In root canal treatment instrument 100 according to the first embodiment, a cumulative angle of rotation is counted without taking into account a load applied to cutting tool 5. Torsional fracture, however, is caused by twist of cutting tool 5 as a result of bite of a cutting edge of cutting tool 5 into a wall of a root canal and forced rotation of cutting tool 5 with cutting tool 5 being restrained in the portion of bite. Therefore, the root canal treatment instrument can prevent fracture of cutting tool 5 due to torsional fracture by counting an angle of rotation during application of a load equal to or higher than a certain level to cutting tool 5 in a cumulative angle of rotation while efficiency in cutting is further enhanced. Drive in the root canal treatment instrument according to a second embodiment will be described with reference to a flowchart. FIG. 14 is a flowchart for illustrating drive of the root canal treatment instrument according to the present second embodiment. Since root canal treatment instrument 100 according to the present second embodiment is also the same in configuration as root canal treatment instrument 100 according to the first embodiment shown in FIGS. 5 to 7, the same reference numerals are employed and detailed description will not be repeated.

In root canal treatment instrument 100 according to the present second embodiment, a type of cutting tool 5 held by head 2 is selected (step S101). For example, a type of cutting tool 5 held by head 2 is selected from among types of cutting tools 5 shown on display portion 16. Without selection by an operator of a type of cutting tool 5, root canal treatment instrument 100 may recognize a type of cutting tool 5 held by head 2 based on identification information (such as an electronic tag) provided in cutting tool 5 and automatically select a type of cutting tool 5. Naturally, root canal treatment instrument 100 according to the present second embodiment may be configured not to select a type of cutting tool 5.

Then, control portion 11 switches a drive sequence in accordance with the selected type of cutting tool 5 (step S102). Since control portion 11 has a set value different for each type of cutting tool 5 as shown in FIG. 4, control portion 11 switches to a drive pattern different in magnitude of a cumulative angle of rotation between use of #15 of company C as cutting tool 5 and use of #20 of company E as cutting tool 5. Naturally, when root canal treatment instrument 100 according to the present second embodiment is configured not to select a type of cutting tool 5, it does not have to switch the drive sequence either.

Description will be given below assuming that, for example, when a cumulative angle of rotation is not greater than a set value, control portion 11 selects such a drive sequence that a drive pattern in which cutting tool 5 is rotated by 180 degrees in the forward direction and 90 degrees in the reverse direction (a drive pattern in which a cumulative angle of rotation increases) is repeated, and when the cumulative angle of rotation attains to the set value, the drive pattern is switched to a drive pattern in which cutting tool 5 is rotated by 90 degrees in the forward direction and 180 degrees in the reverse direction (a drive pattern in which the cumulative angle of rotation decreases). The drive sequence selected by control portion 11, however, is not limited to the drive sequence described above.

Then, control portion 11 drives cutting tool 5 based on the drive sequence and the load detector detects a load applied to cutting tool 5 (step S103). Control portion 11 determines whether or not drive at the time of detection of the load in step S103 is forward rotation drive or reverse rotation drive (step S104). When drive is forward rotation drive (YES in step S104), control portion 11 determines whether or not the detected load is equal to or higher than a reference load (step S105). When drive is reverse rotation drive (NO in step S104), control portion 11 determines whether or not the detected load is lower than the reference load (step S106). The reference load is a load at which it can be determined that a cutting edge of cutting tool 5 is bitten in a wall of a root canal and cutting tool 5 is restrained in this portion of bite, and it is set in advance.

Therefore, when the load detected in forward rotation drive is equal to or higher than the reference load (YES in step S105), control portion 11 counts (calculates) an angle of rotation in the forward direction in the cumulative angle of rotation, regarding the angle of rotation as contributing to torsional fatigue (step S107). When the load detected in forward rotation drive is lower than the reference load (NO in step S105), control portion 11 does not count the angle of rotation in the cumulative angle of rotation, regarding the angle of rotation as not contributing to torsional fatigue, and the process returns to step S103. When the load detected in reverse rotation drive is lower than the reference load (YES in step S106), control portion 11 counts the angle of rotation in the reverse direction in the cumulative angle of rotation, regarding the angle of rotation as eliminating torsional fatigue (step S107). When the load detected in reverse rotation drive is equal to or higher than the reference load (NO in step S106), control portion 11 does not count the angle of rotation in the cumulative angle of rotation, regarding the angle of rotation as not eliminating torsional fatigue, and the process returns to step S103.

Then, control portion 11 determines whether or not the cumulative angle of rotation counted in step S107 is equal to or higher than the set value (step S108). For example, when the set value is set to 500 degrees and when drive by 180 degrees in the forward direction in which the detected load is equal to or higher than the reference load and drive by 90 degrees in the reverse direction in which the detected load is lower than the reference load are repeated five times (see FIG. 3), control portion 11 determines that the cumulative angle of rotation has exceeded the set value. When the cumulative angle of rotation has exceeded the set value (YES in step S108), control portion 11 notifies an operator that the cumulative angle of rotation has exceeded the set value by light or sound (step S109). Furthermore, control portion 11 switches the drive pattern to a drive pattern in which cutting tool 5 is rotated by 90 degrees in the forward direction and 180 degrees in the reverse direction (a drive pattern in which the cumulative angle of rotation decreases) (step S110). Naturally, when the cumulative angle of rotation has exceeded the set value (YES in step S108), control portion 11 may switch the drive pattern without giving a notification in step S109.

When the cumulative angle of rotation is equal to or smaller than the set value (NO in step S108), control portion 11 determines whether or not the cumulative angle of rotation counted in step S107 is smaller than 0 (zero) (step S111). When the cumulative angle of rotation is not smaller than 0 (zero) (NO in step S111), control portion 11 does not switch the drive pattern and the process returns to step S103. For example, when cutting tool 5 is driven in the drive pattern in which the cumulative angle of rotation increases, control portion 11 continues drive in the drive pattern in which the cumulative angle of rotation increases, and when cutting tool 5 is driven in the drive pattern in which the cumulative angle of rotation decreases, control portion 11 continues drive in the drive pattern in which the cumulative angle of rotation decreases.

When the cumulative angle of rotation is smaller than 0 (zero) (YES in step S111), control portion 11 switches to the drive pattern in which the cumulative angle of rotation increases from drive of cutting tool 5 in the drive pattern in which the cumulative angle of rotation decreases (step S112). After processing in steps S110 and S112, control portion 11 determines whether or not input to stop an operation has been accepted (step S113). When control portion 11 has not accepted input to stop an operation (NO in step S113), the process returns to step S103. When control portion 11 has accepted input to stop an operation (YES in step S113), the process ends.

As set forth above, root canal treatment instrument 100 according to the present second embodiment further includes the load detector which detects a load applied to cutting tool 5. Control portion 11 counts an angle of rotation in forward rotation drive in which a load applied to cutting tool 5 and detected by the load detector is equal to or higher than the reference load in the cumulative angle of rotation, and counts an angle of rotation in reverse rotation drive in which a load applied to cutting tool 5 is lower than the reference load in the cumulative angle of rotation. Therefore, control portion 11 can count only a cumulative angle of rotation which contributes to torsional fracture, and fracture of cutting tool 5 due to torsional fracture can be prevented while efficiency in cutting is further enhanced.

When the cumulative angle of rotation attains to the set value by repeated control in a single drive pattern, control portion 11 carries out control to switch to another drive pattern in which the cumulative angle of rotation decreases. Thus, root canal treatment instrument 100 according to the present second embodiment can control drive of cutting tool 5 such that the cumulative angle of rotation is smaller than the set value and fracture of cutting tool 5 due to torsional fracture can be prevented.

When the cumulative angle of rotation attains to the set value, control portion 11 may give a notification. As a result of the notification, an operator can recognize that cutting tool 5 has been driven by the cumulative angle of rotation at which torsional fracture may be caused in cutting tool 5. Furthermore, the operator can perform an operation to pull cutting tool 5 out of a root canal, such as a pecking motion, in response to the notification.

(Modification)

Figure 15:
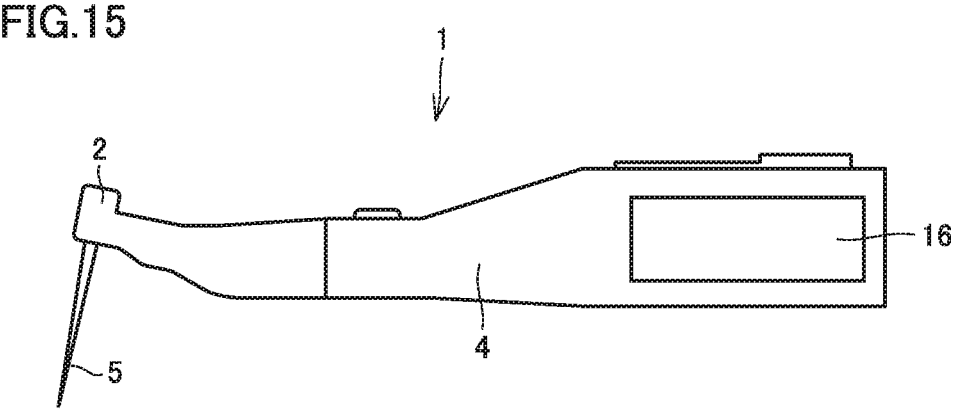
FIG. 15 is a schematic diagram showing a construction of a root canal treatment instrument of a cordless type.

Though the configuration of root canal treatment instrument 100 according to the first to second embodiments in which handpiece 1 is coupled to control box 9 through hose 61 has been described, the present invention is not limited as such and may be configured as a root canal treatment instrument of a cordless type. FIG. 15 is a schematic diagram showing a construction of a root canal treatment instrument of a cordless type. The root canal treatment instrument of the cordless type shown in FIG. 15 incorporates a battery pack, a micromotor, and a control system corresponding to a control box in grip portion 4 of handpiece 1, with various operation portions being provided on a surface of grip portion 4. The root canal treatment instrument of the cordless type further includes display portion 16 in grip portion 4. Therefore, an operator can check information such as whether cutting tool 5 is driven in the cutting direction or in the non-cutting direction, where cutting tool 5 is currently located, how much load is applied to cutting tool 5, or how high the number of rotations is, without greatly changing a line of sight. Though not shown, lead 19 for mouth cavity electrode 19a may be pulled out of grip portion 4.

Though micromotor 7 is employed as a source of motive power for driving cutting tool 5 in root canal treatment instrument 100 according to the first to second embodiments, the present invention is not limited as such and another drive source such as an air motor may be provided.

Root canal treatment instrument 100 according to the first to second embodiments may be configured such that setting portion 14 shown in FIG. 6 sets at least one recipe from a recipe storing a drive sequence, a set value, and a value of a reference load or the like. For example, setting portion 14 may be configured to automatically set a value for a drive sequence or the like from a predetermined recipe by selecting a sex or a height of a patient. Setting portion 14 may be configured to store in advance a value for a drive sequence or the like preferred by an operator as a recipe or store in advance a value for a drive sequence or the like optimal for each patient as a recipe.

Root canal treatment instrument 100 according to the first to second embodiments may be configured such that, depending on a type of cutting tool 5 held by head 2, a drive sequence, a set value, and a value of a reference load or the like are stored in advance in setting portion 14 as a recipe and an operator sets a value for a drive sequence or the like by reading the stored recipe from setting portion 14 based on a type of cutting tool 5 held by head 2. Naturally, setting portion 14 may be configured to set a value for a drive sequence or the like by providing a sensor capable of identifying a type of cutting tool 5 in head 2 and reading a stored recipe based on a result of detection by the sensor.

Furthermore, root canal treatment instrument 100 according to the first to second embodiments may be configured to set, by inputting a fracture angle, a drive sequence, a set value, and a value of a reference load or the like in accordance with the fracture angle. Naturally, an angle of rotation (α1, α2) in the forward direction and an angle of rotation (β1, β2) in the reverse direction in the drive sequence are both equal to or smaller than the fracture angle.

Specifications of root canal treatment instrument 100 according to the first to second embodiments may be such that a parameter such as an angle of rotation (α1, α2) in the forward direction and an angle of rotation (β1, β2) in the reverse direction can freely be input by an operator. Under such specifications, control portion 11 may have a function to restrict a cumulative amount of rotation which is an accumulation of an angle of rotation in forward rotation drive and an angle of rotation in reverse rotation drive so as not to exceed a set value when the drive portion is continuously controlled in accordance with the drive sequence.

In treatment of a root canal, it may be necessary to secure a path for entry (which may be called a glide path) by performing cutting in advance with a cutting tool smaller in diameter before a root canal is cut and enlarged with a cutting tool greater in diameter. When the cutting tool smaller in diameter is driven with a motor, however, the cutting tool is higher in possibility of break than a cutting tool greater in diameter. Root canal treatment instrument 100 according to the first to second embodiments can drive with a motor, cutting tools small to large in diameter by setting a fracture angle of the cutting tool small in diameter to the set value. Therefore, root canal treatment instrument 100 according to the first to second embodiments can safely and reliably perform cutting with a cutting tool large in diameter after securing a path for entry in advance with a cutting tool smaller in diameter.

It should be understood that the embodiments disclosed herein are illustrative and non-restrictive in every respect. The scope of the present invention is defined by the terms of the claims rather than the description above and is intended to include any modifications within the scope and meaning equivalent to the terms of the claims.

REFERENCE SIGNS LIST 1 handpiece; 2 head; 3 neck portion; 4 grip portion; 5 cutting tool; 6 motor unit; 7 micromotor; 8 signal lead; 9 control box; 10 instrument; 10a holder; 11 control portion; 11a to 11d port; 12 root canal length measurement circuit; 13 motor driver; 13a transistor switch; 13b transistor driver circuit; 13c rotation direction switch; 13d load detection resistor; 14 setting portion; 14a, 14b, 14c variable resistor; 15 operation portion; 16 display portion; 17 notification portion; 18 foot controller; 19 lead; 19a mouth cavity electrode; 20 main power supply; 21 main switch; 52, 60 dot display portion; 54, 62 zone display portion; 56 boundary display portion; 58 proximity display portion; 60a element; 61 hose; 64 numeric value display portion; 68 rotary display portion; 71 power supply lead; 100 root canal treatment instrument; 110 comparison circuit

The invention claimed is:
1. A dental treatment apparatus comprising:
a handpiece holding a cutting tool in its head;
a drive portion driving the cutting tool held by the head; and
a control portion controlling the drive portion in accordance with a drive sequence, wherein
the drive sequence includes a plurality of drive patterns which each include:
at least one forward rotation drive for rotating the cutting tool in a cutting direction to cut a treatment portion; and
at least one reverse rotation drive for rotating the cutting tool in a non-cutting direction,
the plurality of drive patterns repeat n times,
under the control of the drive portion in accordance with the drive sequence, a cumulative amount of rotation which is an accumulation of an amount of rotation in the forward rotation drive and an amount of rotation in the reverse rotation drive not exceeding a set value at any time point during the plurality of drive patterns repeating the n times, and
the set value is set based on an angle of break of the cutting tool.
2. The dental treatment apparatus according to claim 1, wherein a sum of cumulative amounts of rotation in the plurality of drive patterns does not exceed the set value, and an amount of rotation in the forward rotation drive, and an amount of rotation in the reverse rotation drive do not exceed the set value.

3. The dental treatment apparatus according to claim 2, wherein
a sum of a cumulative amount of rotation in a first drive pattern of the plurality of drive patterns and a cumulative amount of rotation in a second drive pattern of the plurality of drive patterns attains to zero or the value in the non-cutting direction.

4. The dental treatment apparatus according to claim 2, wherein the control portion can accept input of at least one parameter of an amount of rotation in the plurality of drive patterns and the n times of repetition of the drive patterns.

5. The dental treatment apparatus according to claim 1, the dental treatment apparatus further comprising a load detector which detects a load applied to the cutting tool, wherein
the control portion counts an amount of rotation in the forward rotation drive in which a load applied to the cutting tool and detected by the load detector is equal to or higher than a reference load in the cumulative amount of rotation and counts an amount of rotation in the reverse rotation drive in which the load applied to the cutting tool is lower than the reference load in the cumulative amount of rotation.

6. The dental treatment apparatus according to claim 5, the dental treatment apparatus comprising a plurality of drive patterns including at least one of the forward rotation drive and the reverse rotation drive, wherein
the control portion carries out control to switch to another drive pattern in which the cumulative amount of rotation is decreased when the cumulative amount of rotation attains to the set value by repeated control in a single drive pattern.

7. The dental treatment apparatus according to claim 1, wherein
the control portion gives a notification when the cumulative amount of rotation attains to the set value.

8. The dental treatment apparatus according to claim 1, wherein
the control portion has the set value different for each type of the cutting tool and carries out control to switch the drive sequence to be controlled.

9. The dental treatment apparatus according to claim 3, wherein
the control portion can accept input of at least one parameter of an amount of rotation in the plurality of drive patterns and the n times of repetition of the drive patterns.

10. The dental treatment apparatus according to claim 2, the dental treatment apparatus further comprising a load detector which detects a load applied to the cutting tool, wherein
the control portion counts an amount of rotation in the forward rotation drive in which a load applied to the cutting tool and detected by the load detector is equal to or higher than a reference load in the cumulative amount of rotation and counts an amount of rotation in the reverse rotation drive in which the load applied to the cutting tool is lower than the reference load in the cumulative amount of rotation.

11. The dental treatment apparatus according to claim 3, the dental treatment apparatus further comprising a load detector which detects a load applied to the cutting tool, wherein
the control portion counts an amount of rotation in the forward rotation drive in which a load applied to the cutting tool and detected by the load detector is equal to or higher than a reference load in the cumulative amount of rotation and counts an amount of rotation in the reverse rotation drive in which the load applied to the cutting tool is lower than the reference load in the cumulative amount of rotation.

12. The dental treatment apparatus according to claim 4, the dental treatment apparatus further comprising a load detector which detects a load applied to the cutting tool, wherein
the control portion counts an amount of rotation in the forward rotation drive in which a load applied to the cutting tool and detected by the load detector is equal to or higher than a reference load in the cumulative amount of rotation and counts an amount of rotation in the reverse rotation drive in which the load applied to the cutting tool is lower than the reference load in the cumulative amount of rotation.

13. The dental treatment apparatus according to claim 6, wherein
the control portion gives a notification when the cumulative amount of rotation attains to the set value.

14. A dental treatment apparatus comprising:
a handpiece holding a cutting tool in its head;
a drive portion driving the cutting tool held by the head; and
a control portion controlling the drive portion in accordance with a drive sequence, wherein
the drive sequence repeats forward rotation drive for rotating the cutting tool in a cutting direction to cut a treatment portion and reverse rotation drive for rotating the cutting tool in a non-cutting direction such that the forward rotation drive and reversed rotation drive are repeated n times,
a cumulative amount of rotation from a position of start of drive of the cutting tool is smaller than a set value at any time point during the repeated n times, and
the set value is set based on an angle of break of the cutting tool.

15. A method of driving a dental treatment apparatus, the dental treatment apparatus including a drive portion driving a cutting tool held by a head of a handpiece, the method comprising:
controlling the drive portion in accordance with a drive sequence, wherein
the drive sequence includes a plurality of drive patterns which each include:
at least one forward rotation drive for rotating the cutting tool in a cutting direction to cut a treatment portion; and
at least one reverse rotation drive for rotating the cutting tool in a non-cutting direction,
the plurality of drive patterns repeat n times,
under the control of the drive portion in accordance with the drive sequence, a cumulative amount of rotation which is an accumulation of an amount of rotation in the forward rotation drive and an amount of rotation in the reverse rotation drive not exceeding a set value at any time point during the plurality of drive patterns repeating the n times, and the set value is set based on an angle of break of the cutting tool.

\* \* \* \* \*